United States Patent
Chainer et al.

(10) Patent No.: US 6,324,027 B1
(45) Date of Patent: Nov. 27, 2001

(54) METHOD AND APPARATUS FOR CORRECTING FOR RANDOM ERRORS IN TIMING PATTERN GENERATION

(75) Inventors: Timothy Joseph Chainer, Mahopac; Mark Delorman Schultz, Elmsford; Bucknell Chapman Webb, Ossining; Edward John Yarmchuk, Mahopac, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/316,884

(22) Filed: May 21, 1999

Related U.S. Application Data

(60) Division of application No. 08/891,122, filed on Jul. 10, 1997, now Pat. No. 6,078,450, which is a continuation-in-part of application No. 08/628,910, filed on Apr. 8, 1996, now Pat. No. 5,901,003, which is a division of application No. 08/348,773, filed on Dec. 1, 1994, now abandoned.

(51) Int. Cl.[7] .................................................. G11B 5/09
(52) U.S. Cl. ............................................. 360/51; 360/75
(58) Field of Search ......................... 360/51, 75, 77.08, 360/53, 73.03, 78.04, 78.09, 78.14

(56) References Cited

U.S. PATENT DOCUMENTS

| 4,414,589 | 11/1983 | Oliver et al. ........................ 360/77 |
| 4,879,608 | 11/1989 | Sano ..................................... 360/51 |
| 4,912,576 | 3/1990 | Janz .................................. 360/77.07 |
| 5,229,901 | 7/1993 | Mallary .............................. 360/104 |
| 5,416,652 | 5/1995 | Lewis ................................... 360/48 |
| 5,485,322 | 1/1996 | Chainer et al. ....................... 360/51 |
| 5,581,420 | 12/1996 | Chainer et al. ....................... 360/75 |
| 5,612,833 | 3/1997 | Yarmchuk et al. ................... 360/75 |
| 5,615,058 | 3/1997 | Chainer et al. ....................... 360/51 |
| 5,682,274 | * 10/1997 | Brown et al. ................. 360/77.08 X |

FOREIGN PATENT DOCUMENTS

| A-04 023276 | 5/1992 | (JP) . |
| A-63 000872 | 6/1988 | (JP) .............................. G11B/21/10 |
| WO 94/11864 | 5/1994 | (WO) . |

OTHER PUBLICATIONS

"Regenerative Clock Technique For Servo Track Writers," IBM Technical Disclosure Bulletin, vol. 33 No. 5, pp. 310–311 (Oct. 1990).

* cited by examiner

Primary Examiner—Andrew L. Sniezek
(74) Attorney, Agent, or Firm—Abdy Raissinia, Esq.; Blanche E. Schiller, Esq.; Heslin Rothenberg Farley & Mesiti P.C.

(57) ABSTRACT

Improvements in placement of timing patterns in self-servowriting include correcting for random errors. Random errors may be caused by variations in disk velocity and therefore, one technique for correcting for random errors includes reducing velocity jitter. Additionally, random errors can be corrected by improving interval control during the propagation of trigger patterns used in writing timing information on storage media. Further, random errors, in the writing of timing information, can be corrected during a single revolution of the storage media. This eliminates additional rotations, thereby providing a large capital cost savings.

14 Claims, 27 Drawing Sheets

METHOD AND APPARATUS FOR CORRECTING FOR RANDOM ERRORS IN TIMING PATTERN GENERATION

This application is a divisional application of commonly assigned application Ser. No. 08/891,122 filed Jul. 10, 1997 U.S. Pat. No. 6,078,450, which is a continuation-in-part application of commonly assigned application Ser. No. 08/628,910, filed Apr. 8, 1996 U.S. Pat. No. 5,901,003, which is a divisional application of application Ser. No. 08/348,773, filed Dec. 1, 1994, now abandoned. Application Ser. No. 08/628,910 is hereby incorporated herein by reference in its entirety.

CROSS REFERENCE TO RELATED APPLICATIONS

This application is related to U.S. Pat. No. 5,485,322 of T. Chainer et al. issued on Jan. 16, 1996 entitled, "Method and System for writing a Clock Track on a Storage Medium", which is a divisional application of application Ser. No. 08/028,044, filed Mar. 8, 1993, now abandoned. U.S. Pat. No. 5,485,322 is commonly assigned herewith, and hereby incorporated herein by reference in its entirety. It is also related to U.S. Pat. No. 5,612,833 of E. Yarmchuk et. al., issued on Mar. 18, 1997 entitled, "Radial Self-Propagation Pattern Generation for Disk File Servowriting," which is also hereby incorporated herein by reference in its entirety.

TECHNICAL FIELD

The invention relates generally to hard disk drive memory storage devices for computers. More particularly, it relates to disk drive apparatus and to a method for writing servotrack information therein. More specifically it relates to alleviating the need for a complex mechanical and/or optical positioning system to establish servopatterns on the recording surfaces of the recording media.

BACKGROUND ART

Increased levels of storage capacity in floppy and hard disk drives are a direct result of the higher track densities possible with voice-coil and other types of servo positioners, as well as the ability to read and write narrower tracks by using, for example, magnetoresistive (MR) head technology. Previously, low track density disk drives were able to achieve satisfactory head positioning with leadscrew and stepper motor mechanisms. However, when track densities become so great that the mechanical error of a leadscrew stepper motor combination is significant compared to track-to-track spacing, an embedded servo is needed so that the position of the head can be determined from the signals it reads.

Conventional servo-patterns (also referred to as servo-data) typically include short bursts of a constant frequency signal, very precisely located offset from a data track's center line, on either side. The bursts are written in a sector header area, and can be used to find the center line of a track. Staying on center is desired during both reading and writing. Since there can be sixty, or even more, sectors per track, that same number of servo-data areas must be dispersed around a data track. These servo-data areas allow a head to follow a track center line around a disk, even when the track is out of round, as can occur with spindle wobble, disk slip and/or thermal expansion. As technology advances to provide smaller disk drives, and increased track densities, the placement of servo-data must also be proportionately more accurate.

One example of servo-data is shown in FIG. 1, which includes a sector header 2 followed by a pattern to provide radial position information. The sector header includes a Servo ID (SID) Field 4 and a Grey Code Field 6, which require precise alignment track to track. Misalignment in these patterns results in destructive interference of the magnetic pattern and reduces the amplitude of the signal which leads to errors. Specifications on the alignment in modern disk drives is approximately 25 nanosec (3 sigma) track to track for a disk rotation period of roughly 11 milliseconds or 2.3 ppm. This narrow time window therefore requires precise measurement of the disk angular position over many revolutions of the disk.

As disk drives strive to increase data capacity, there is a desire to reduce the size of the servo-data areas, such that they take up less space on the disk. In order to reduce the size, however, the servo-data are written at higher and higher frequencies. These higher frequencies require tighter timing tolerances from track to track.

In one example, timing is provided by writing trigger patterns at various locations of the disk. It is understood that in writing a trigger pattern a specified time after a trigger, the presence of electronic delays in the trigger and write circuitry is taken into consideration. This is described in IBM Technical Disclosure Bulletin, Vol. 33, No. 5 (October 1990), where the delay between A and B clock areas is measured and stored. This delay value is used to advance the write timing of all subsequent servo-tracks and clock areas.

Although, the IBM Technical Disclosure Bulletin, Vol. 33, No. 5 (October 1990) discussed the presence of electronic delays, it did not discuss how to achieve optimum track to track trigger pattern alignment in the presence of random errors. The growth of these errors has thus far prevented the commercial application of various proposed techniques for self-clock generation, since there are precise requirements for timing alignment in modern disk drives.

Therefore, a need still exists for a capability to reduce systematic errors in the writing of timing patterns. In particular, a need exists for an improved capability to:

1) Minimize the effect of velocity jitter without decreasing the interval size, such that a source of random errors is at least reduced.
2) Improve the control of intervals, which in turn reduces random errors during timing pattern generation.
3) Achieve track to track alignment without incurring an additional revolution of the disk. This at the very least reduces the growth of random errors during a single revolution of the disk.

SUMMARY OF THE INVENTION

The shortcomings of the prior art are overcome and additional advantages are provided through the provision of a method for measuring the velocity of a storage medium at a given time. In one example, a time interval between a first trigger pattern and a second trigger pattern is measured prior to the given time. A substantially instantaneous velocity of the storage medium is computed based on the time interval, and a next trigger pattern is written after the given time, at a delay time. The delay time is to correct for a deviation between the substantially instantaneous velocity of the storage medium and an average velocity of the storage medium. The measuring, computing and writing are performed on a same revolution of the storage medium with a single head.

In another embodiment of the invention, a method for determining whether a trigger pattern is misplaced is provided. A first time interval between a first trigger pattern and a second trigger pattern is determined. Additionally, a second time interval between the first trigger pattern and a third trigger pattern is determined. The first and second time intervals are compared to determine whether the first trigger pattern is misplaced.

In yet another embodiment of the present invention, a method of generating timing patterns for self-servowriting of a storage medium of a storage device is provided. A first set of trigger patterns is written at a first radial location of the storage medium. During a single revolution of the storage medium, a second set of trigger patterns is written at a second radial location of the storage medium and one or more random errors in location of the second set of trigger patterns relative to the first set of trigger patterns is determined. One or more correction values is computed to compensate for the one or more random errors, and one or more trigger patterns is written at a subsequent radial location of the storage medium at locations altered by the correction values. The errors in placement of the one or more trigger patterns at the subsequent radial location are reduced.

In another aspect of the present invention, an apparatus for measuring the velocity of a storage medium at a given time is provided. In one example, the apparatus includes a measuring unit adapted to measure a time interval between a first trigger pattern and a second trigger pattern prior to the given time; a controlling unit adapted to compute a substantially instantaneous velocity of the storage medium based on the time interval; and a pattern generator adapted to write a next trigger pattern after the given time at a delay time. The delay time is to correct for a deviation between the substantially instantaneous velocity and an average velocity of the storage medium. The measuring, computing and writing are performed on a same revolution of the storage medium with a single head.

In another aspect of the present invention, an apparatus for determining whether a particular trigger pattern is misplaced is provided. In one example, the apparatus includes a first measuring unit adapted to determine a first time interval between a first trigger pattern and a second trigger pattern; a second measuring unit adapted to determine a second time interval between the first trigger pattern and a third trigger pattern; and a processing unit adapted to compare the first and second time intervals to determine whether the first trigger pattern is misplaced.

In yet another aspect of the present invention, an apparatus for generating timing patterns for self-servowriting of a storage medium of a storage device is provided. In one embodiment, the apparatus includes a controlling unit adapted to write a first set of trigger patterns at a first radial location of the storage medium. The controlling unit is further adapted to write, during a single revolution of the storage medium, a second set of trigger patterns at a second radial location of the storage medium and to determine one or more random errors in location of the second set of trigger patterns relative to the first set of trigger patterns. Additionally, the apparatus includes, for instance, a processing unit adapted to compute correction values to compensate for the one or more random errors; and a pattern generator adapted to write one or more trigger patterns at a subsequent radial location of the storage medium at locations altered by the correction values. The errors in placement of the one or more trigger patterns at the subsequent radial location are reduced.

The present invention advantageously corrects for random errors. In one aspect of the present invention, a source of random errors is reduced or eliminated. In particular, an improved capability is provided for measuring the velocity of a storage medium, such that velocity jitter, which is a source of random errors, is reduced, at the very least.

Additionally, the propagation of random errors is reduced during timing pattern generation by improving the correction of trigger pattern placement. Further, track to track alignment without growth of random errors is accomplished without incurring an additional revolution of the disk.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

SELF-SERVOWRITER OVERVIEW

Figure 3A:
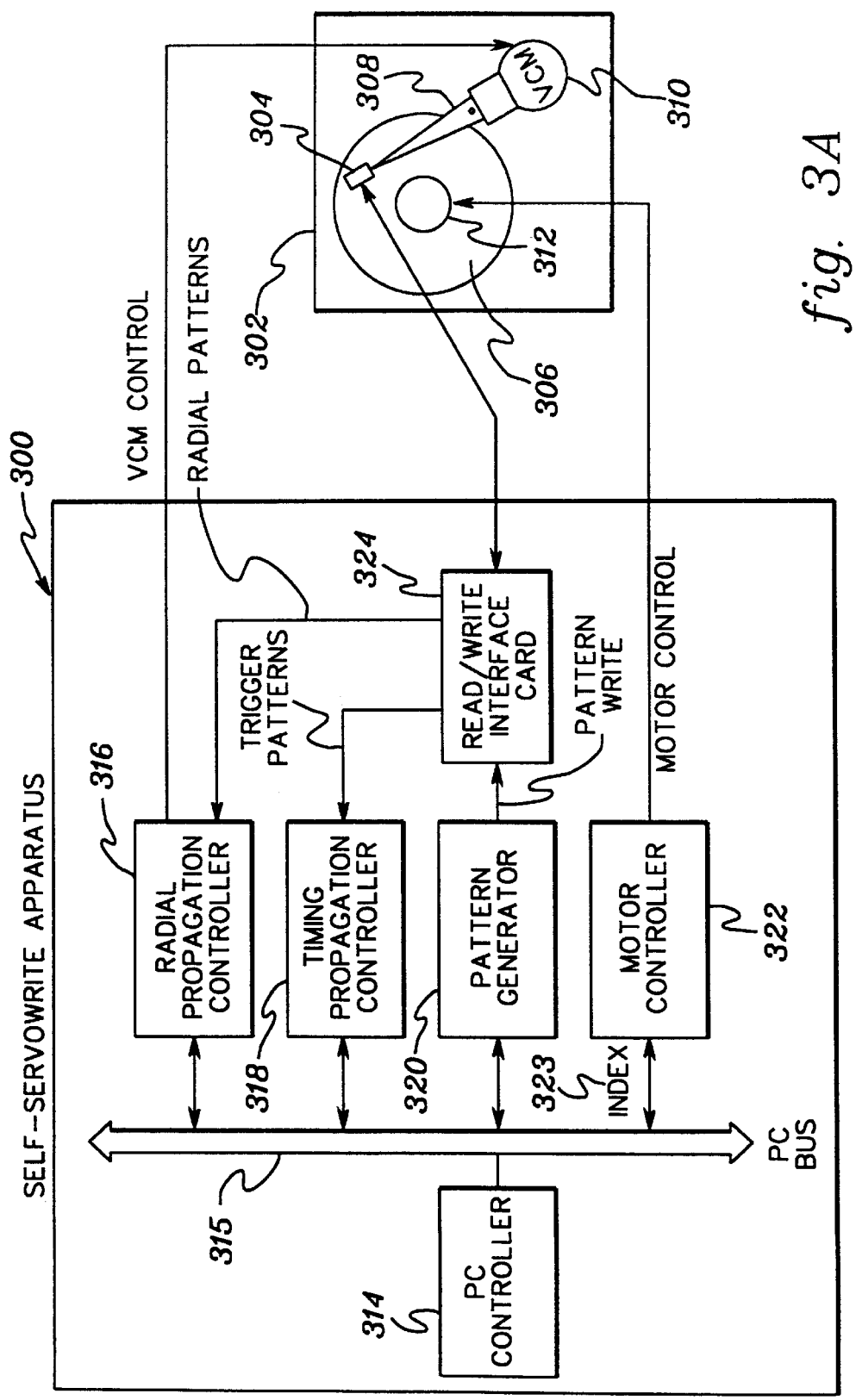
FIGS. 3a–3c depict one example of a self-servowrite apparatus incorporating and using the capabilities of the present invention.
Figure 3B:
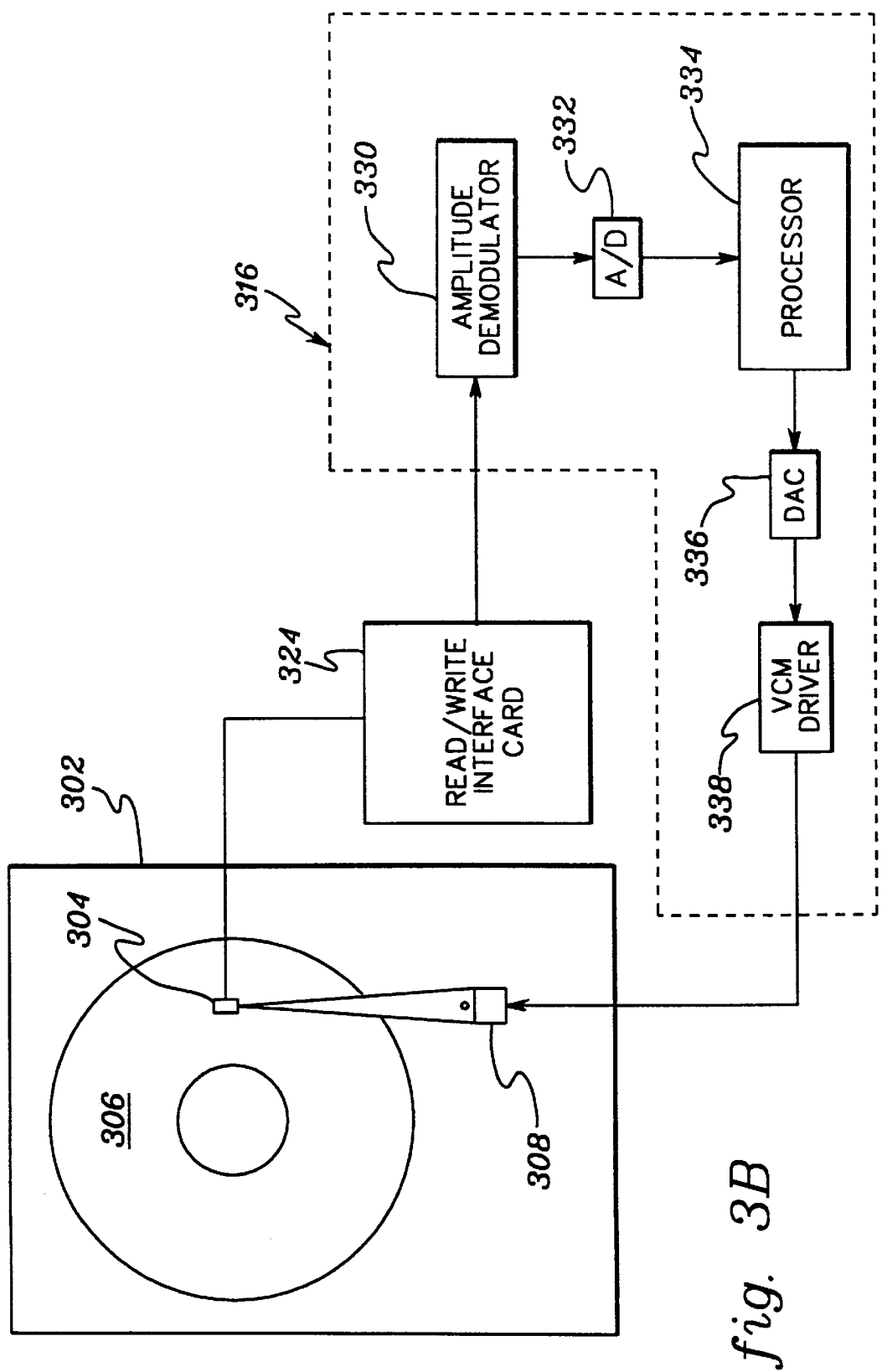
Figure 3C:
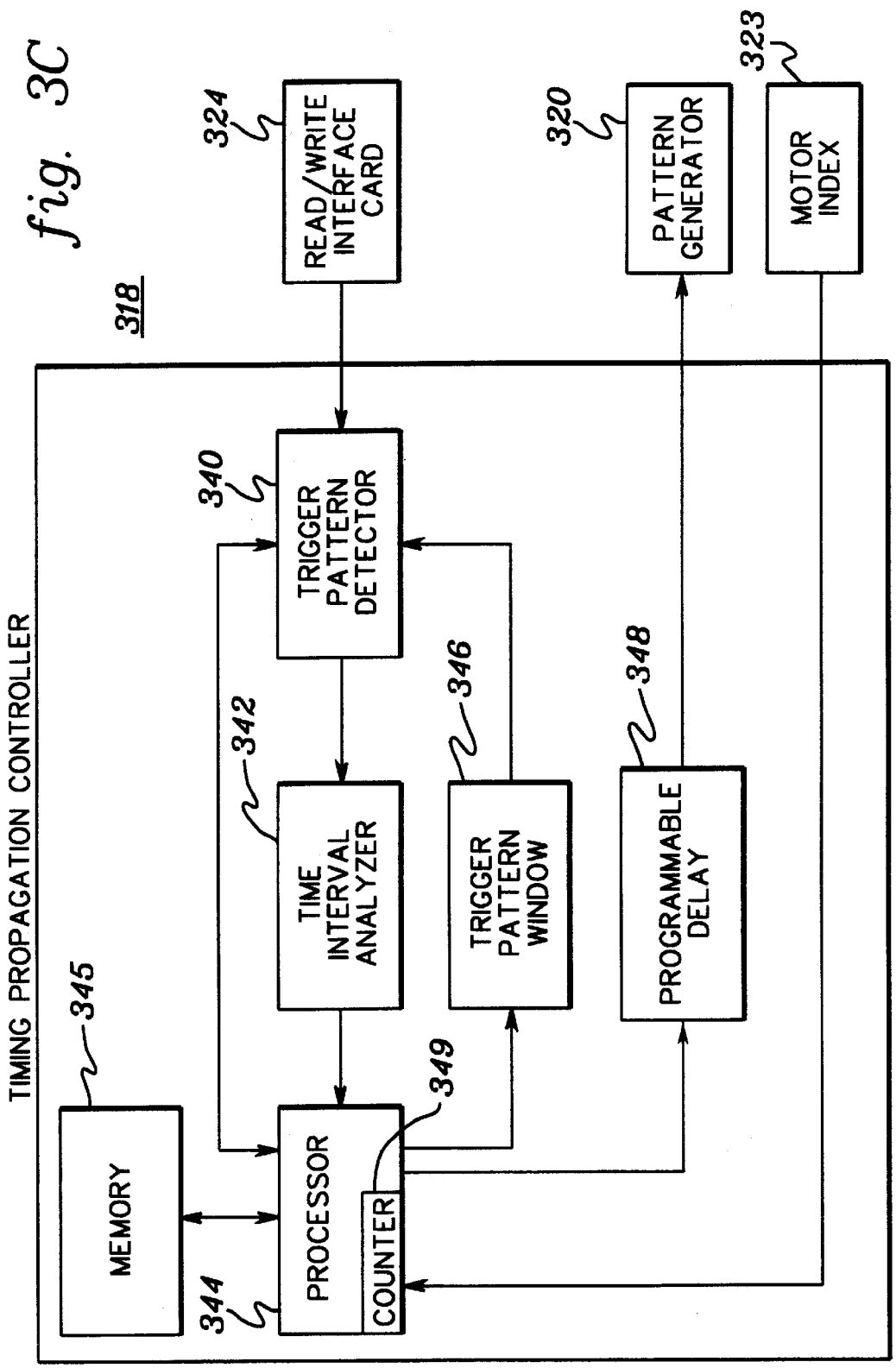

One embodiment of a self-servowrite apparatus incorporating and using the capabilities of the present invention is shown in FIGS. 3a–3c, and described in detail below.

Referring to FIG. 3a, in one example, a self-servowrite apparatus 300 interfaces to, for instance, a storage device 302 (such as, for instance, a disk storage device). In one embodiment, the storage device includes a recording head or transducer 304, which writes information to and/or reads information from one or more storage medium 306 (referred to herein as storage media). The storage medium rotates via a motor 312 located within storage device 302.

Transducer 304 is coupled to an actuator 308, used in moving the transducer radially along the storage media. Transducer 304 receives its signals from a voice coil motor 310 coupled thereto.

The storage device is coupled to self-servowrite apparatus 300, as described in further detail herein. In one example, self-servowrite apparatus 300 includes a PC controller 314, a radial propagation controller 316, a timing propagation controller 318, a pattern generator 320, a motor controller 322 and a read/write interface card 324, each of which is described below.

PC controller 314 is a standard personal computer (such as, for instance, an Aptiva Model 2176 offered by International Business Machines Corporation) coupled to other components of the system via a system bus 315. In one example, the system bus conforms to ISA standards and enables communication among the PC controller and the other system components, as well as between the components themselves. The bus allows addressing and control of the other components by the PC controller. In particular, the controller is controlling the components on a sector by sector basis during the technique of the present invention. In another example, the bus can be eliminated and each of the components can communicate directly.

Coupled to bus 315 is radial propagation controller 316, which is used to control the writing of radial propagation bursts (described below) on storage medium 306. In particular, the radial propagation controller reads the propagation bursts along a track on the storage media to position the transducer to write subsequent propagation bursts on a next track.

One example of a radial propagation controller is described with reference to FIG. 3b. In one example, radial propagation controller 316 includes an amplitude demodulator 330, which receives as input readback signals from read/write interface card 324. The read/write interface card receives the signals from recording transducer 304. The amplitude demodulator converts the readback signals to a position signal, which is input to an analog/digital (A/D) converter 332. The converter converts the signal to digital and passes the signal to a processor 334 (e.g., a digital processor, such as a TMS 320 offered by Texas Instruments).

The processor calculates the error in the present head position from the desired position and outputs a correction value to a digital to analog converter (DAC) 336. DAC 336 converts the correction value into an analog signal, which is input to a voice coil motor (VCM) driver 338. The VCM driver converts the analog voltage signal into a current, which drives actuator 308 to move transducer 304.

Returning to FIG. 3a, timing propagation controller 318 is also coupled to system bus 315. The timing propagation controller controls the writing of trigger patterns (described below) on a given track. In particular, it reads trigger patterns on one track and writes subsequent trigger patterns on a next track.

One example of a timing propagation controller is described with reference to FIG. 3c. In one example, timing propagation controller 318 includes a trigger pattern detector 340, a time interval analyzer 342, a processor 344, one or more memory units 345 coupled to processor 344, a trigger pattern window 346 and a programmable delay 348, each of which is described below.

Input to trigger pattern detector 340 are readback trigger patterns output from read/write interface card 324. Detector 340 converts the readback trigger patterns into a digital signal, which is input to time interval analyzer 342.

Time interval analyzer 342 precisely measures the time between trigger patterns. In one example, time interval analyzer 342 is a HP 5372A. The measured time is output from analyzer 342 and input into processor 344.

In one example, processor 344 is a digital processor (e.g., a TMS 320 offered by Texas Instruments), which stores the information received from analyzer 342, as well as other components of controller 318. Processor 344 includes the logic used to perform many of the calculations and determinations used in the present invention, as described below with reference to the flow diagrams. For example, the processor is used to calculate a delay value used to shift the location or a subsequent pattern generator output to write a trigger pattern.

In one example, the processor controls the opening of trigger pattern window 346 at a desired time, which enables the trigger pattern detector at the desired times, such that the incidences of false triggers are reduced.

In addition to the above, controller 318 includes programmable delay 348, which receives its input from processor 344. Processor 344 uses the time measurements provided by time analyzer 342 to calculate a shift value, which is input to programmable delay 348. The shift value is used to shift the writing of the product servo-patterns. The programmable delay provides the shifted signals (e.g., in time) to pattern generator 320.

An input to processor 344 is motor index 323. In particular, the motor index is input to a counter 349 within the processor. The counter measures the time between the index and a first trigger pattern. When the motor index comes in, the counter starts counting until the next trigger pattern is detected.

Referring back to FIG. 3a, the system also includes pattern generator 320, used to write patterns and to store them in its memory. It is capable of writing various patterns, such as, for instance, radial propagation burst patterns, trigger patterns and/or product servo-patterns, which are described below.

The radial propagation burst patterns provide radial information to move the actuator inwards while servoing on the edge of the tracks. The trigger patterns are used to derive precise timing or circumferential information for use in writing product servo-patterns. Using the radial and trigger patterns, the product servo-patterns are written. Particularly, the radial and trigger patterns are used to precisely line up the product servo-patterns track to track.

In one example, in order to write a track of servo-patterns, the radial propagation controller instructs the pattern generator to write a sequence of radial bursts on a track of the storage media via read/write interface card 324. The read/write interface card provides a signal to the transducer to write patterns on the storage media. Further, the timing propagation controller controls the pattern generator to write product servo-patterns at specified locations.

Although the pattern generator is depicted as a separate component within the self-servowrite apparatus, it can be a part of other components, such as, for instance, the radial propagation controller and/or the timing propagation controller.

The output of pattern generator 320 (e.g., a stored pattern) is, for example, input to read/write interface card 324, which generates one or more signals representative of the stored pattern. The signals are input to recording head 304, which writes the signals on storage media 306.

In addition to the above, in one example, self-servowrite apparatus 300 includes motor controller 322 used to rotate storage media 306 and to derive an index pulse 323 from motor 312 of the storage device.

Described above is one example of a self-servowrite apparatus coupled to a storage device. The self-servowrite apparatus and/or the storage device may include additional, less and/or different components than that described above without departing from the spirit of the present invention. For instance, one processor may be used to perform the operations of PC controller 314, processor 334 and/or processor 344. Alternatively, a plurality of processors may be employed to perform the functions of one or more of the above-described processors. For example, processor 344 may include one or more processors (referred to as a processing unit).

Further, one or more timing propagation controllers may be used to perform the functions provided by timing propagation controller 318. These one or more controllers form a controlling unit. Similarly, one or more radial propagation controllers may be used to perform the functions provided by radial propagation controller 316. Again, the one or more controllers form a controlling unit. It is also possible that the functions of the radial and timing propagation controllers can be combined into one or more controllers, which also can be referred to as a controlling unit.

Typically, a commonly used, servo architecture known as "embedded servo" in which servo pattern information is present on all disk surfaces is used in disk drives. A dual revolution clock propagation process described herein and in U.S. Pat. No. 5,485,322 is used to gate pattern generator 320 to write servo patterns onto all surfaces. The ability to accomplish this with a minimum of revolutions is important in the case when the servowriter is external to the disk drive which is contemplated to be the preferred commercial implementation of this invention. To write the embedded servo requires a clock to position the embedded servo circumferentially.

Figure 1:
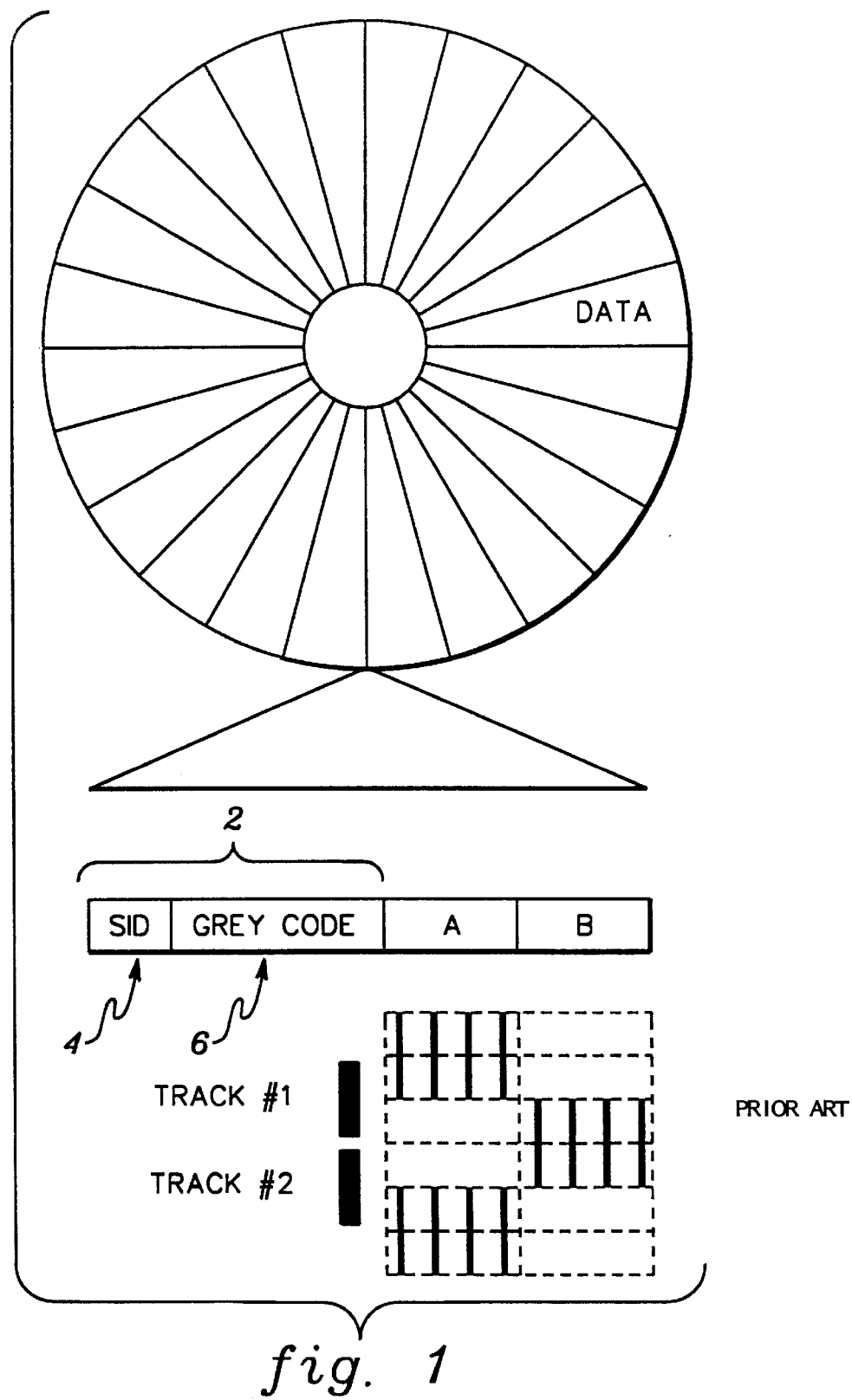
FIG. 1 illustrates a disk and a typical disk servo pattern.
Figure 2A:
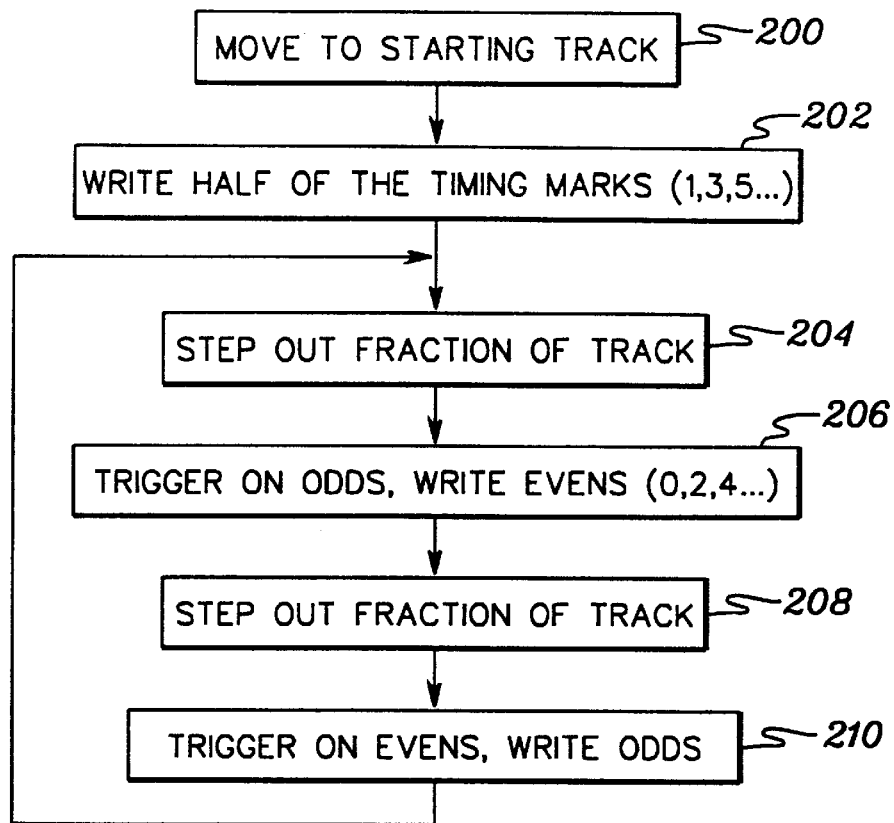
FIG. 2a depicts one embodiment for writing timing marks on a disk surface.
Figure 2B:
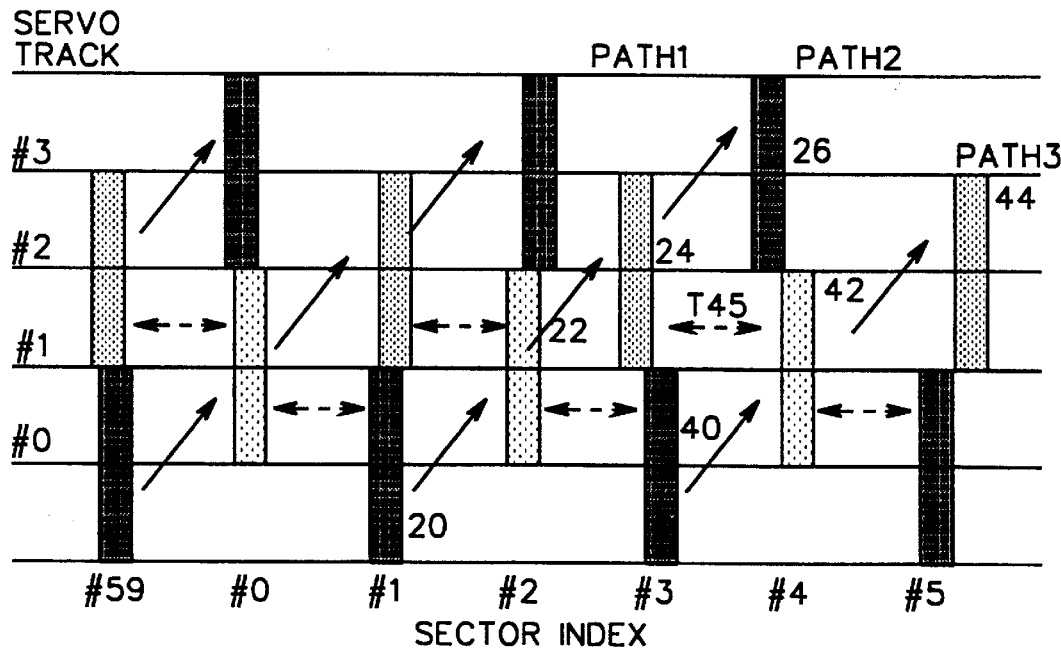
FIG. 2b shows how independent casual paths of pattern propagation are generated and can be eliminated by measuring and by using an additional revolution of the disk.

Any process used to generate a clock for the pattern generator by self-propagation using only the disk drive data heads typically requires several thousand steps during the servowriting of the disk surface. Since a single head cannot write and read simultaneously, self-propagation requires dividing a track on the disk into alternating sectors, such that timing synchronization is obtained in one sector just prior to writing the next sector as shown in FIGS. 2a–2b. After moving the head to an initial starting track, track #0, STEP 200, trigger patterns (TP) are written on the odd numbered sectors, STEP 202. The head is displaced a fraction of a track to servo track #1, STEP 204, and the odd numbered sectors 1, 3, 5, . . . 59 are used for synchronization in writing the subsequent TP's on the even numbered sectors 0, 2, 4, . . . 60, STEP 206. The head is again displaced a fraction of the track to servo track #2, STEP 208, and the roles are reversed, with the even numbered sectors used for synchronization in writing the subsequent odd numbered sectors, STEP 210. This process continues until the head is displaced across the recording surface.

Each time a sector is written, a small but unavoidable timing error called the base error occurs due to both disk rotational velocity changes and electrical noise in the read-back signal used for synchronization. These errors are replicated on the next step as the written sectors change over to synchronization sectors. A new and independent set of random errors is added here as well. Thus, the self-propagation process involves a replication and summation of the random errors in each step. Left uncorrected, statistically such errors grow as the root mean square of the number of steps. Since the process of synchronization and writing is causal, i.e. synchronization occurs before writing on each step, the sequence of random errors that determines the location of a given sector timing pattern can be traced back in a spiral path which is shown by the arrows labeled Path1, Path2 and Path3 of FIG. 2b. The paths run in parallel and for adjacent radial locations at each sector are totally independent so the track to track misalignment ends up as the difference between two independent random walks, giving an additional factor of the square root of 2. Therefore, after 10,000 steps, the RMS track to track error would be 141 times the base error. It should be noted that this process can work with other than alternating patterns limited to two. For instance, two or three patterns may be used for clock propagation.

As described in U.S. Pat. No. 5,485,322, errors in the pattern propagation process can be detected and corrected to produce precise magnetic pattern alignment from track to track. Errors written at each step are measured during a subsequent revolution of the disk and are accounted for and corrected. For example, in FIG. 2b prior to writing TP 26, the interval between TP 24 and TP 42 is measured on an extra revolution of the disk and stored as a time interval T45. The time interval T45 is used when the head is positioned on servo track #3 and triggers on TP 24 to write TP 26 aligned to TP 42. The extra revolution of the disk breaks the causal chains denoted by Path 2 and Path 3, effectively locking together the normally independent random walk paths and Preventing the growth of track to track misalignment. This process, as described in U.S. Pat. No. 5,485,322, is referred to herein as the "dual revolution clock propagation process."

Figure 4A:
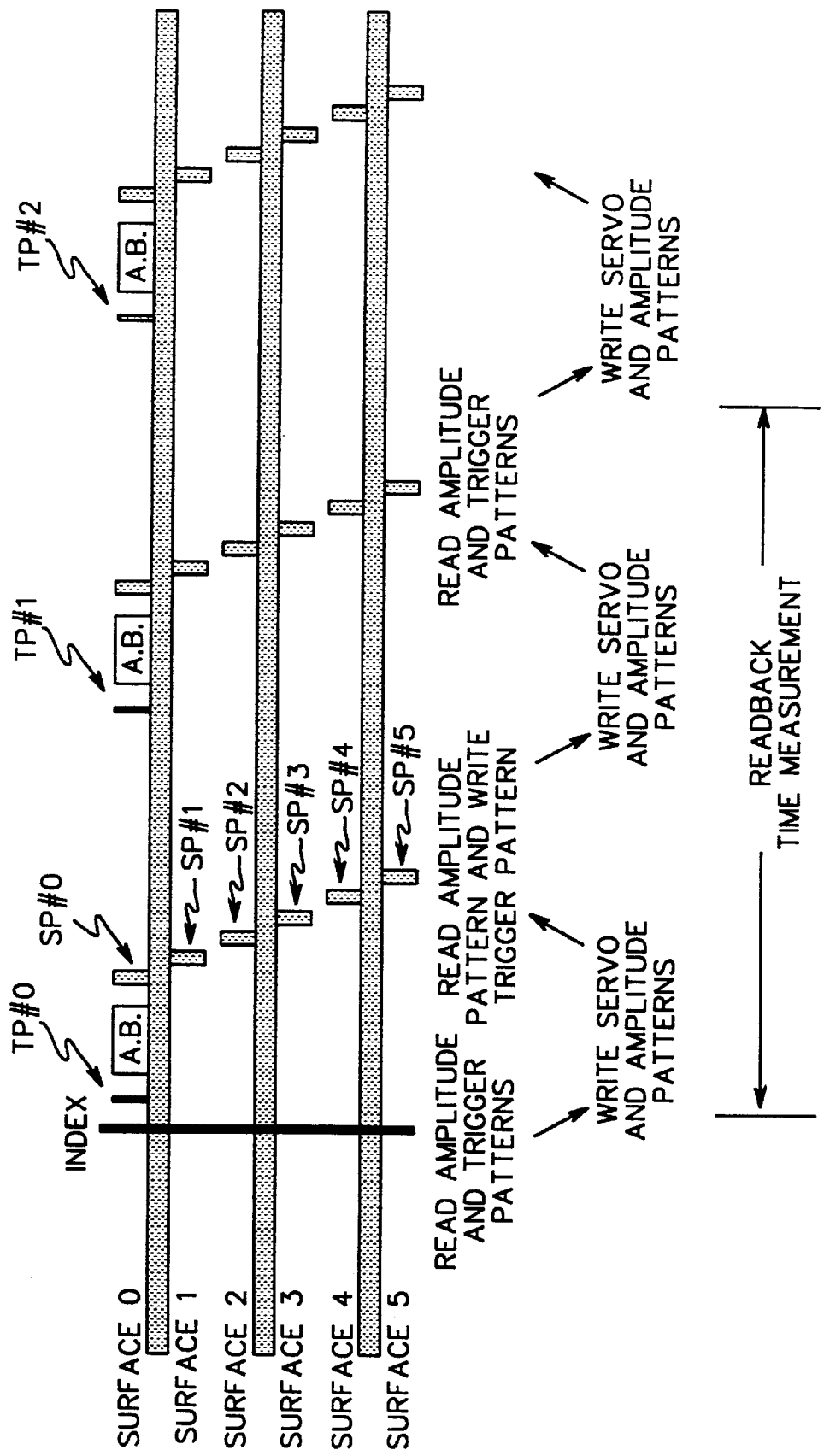
FIGS. 4a–4b show one example of how servo patterns are written with a dual revolution process.
Figure 4B:
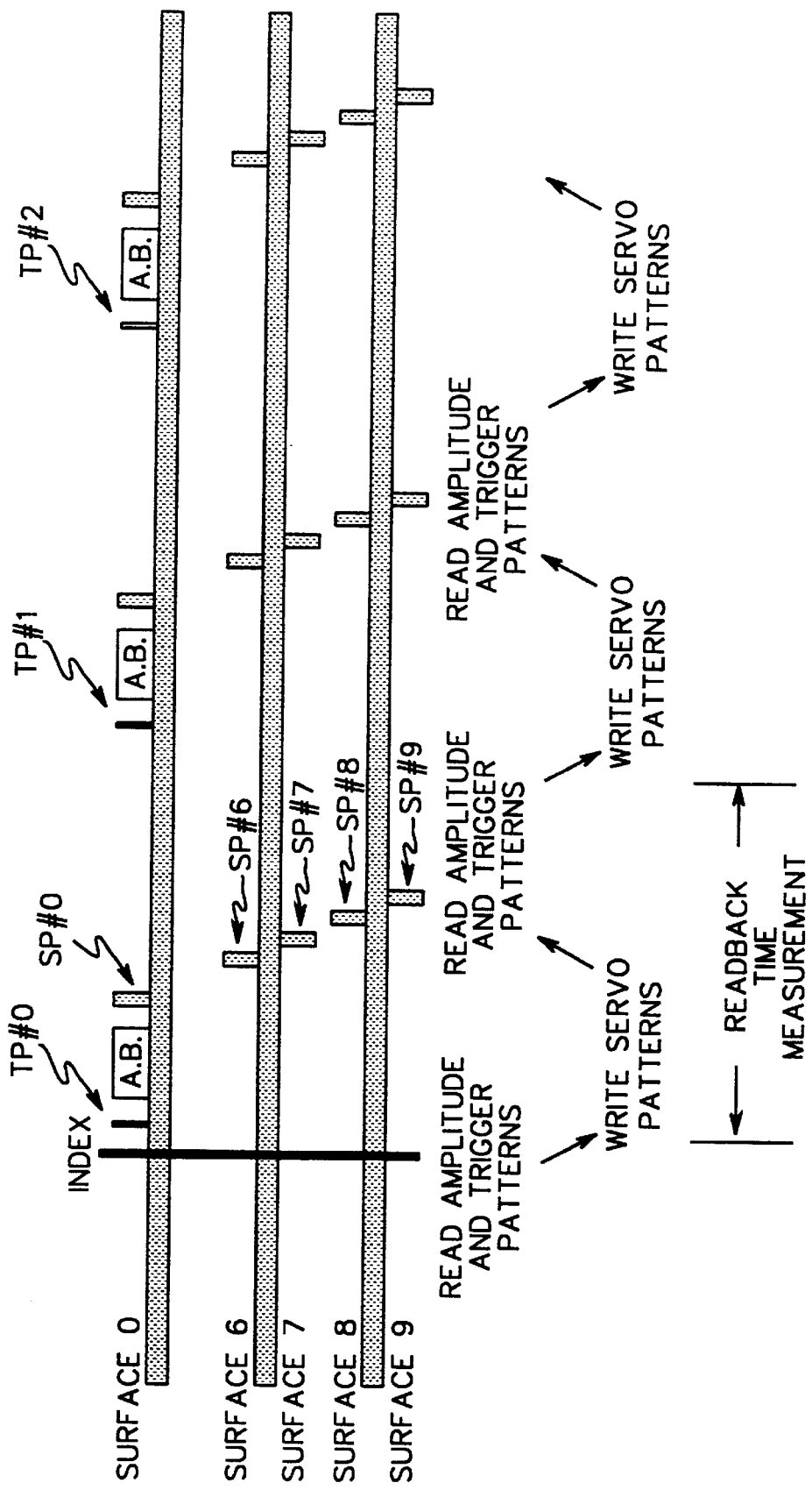

In FIGS. 4a–4b, there is shown one embodiment of a process by which trigger patterns are used to write servo patterns on a first surface using a first recording head and other surfaces by switching to other recording heads on other recording surfaces. The recording head is set to read mode and triggers on TP#0, which begins gating pattern generator 320 to write servo pattern SP#0, then the next recording head in the stack of a multiplatter disk drive is selected and a second servo pattern SP#1 is written on surface #1 and repeated to N surfaces. The number N is limited by the time required to write each surface and switch the heads. At the end of the Nth surface, the head is switched to the first surface #0 in time to read the next sector TP#1. This process makes clear the advantage of trigger patterns as their short time allows other surfaces to be written with servo patterns within the same revolution of the disk, thus reducing servo write time. In particular, servo-patterns can be written while writing trigger patterns.

GEOMETRICAL EFFECTS RESULTING IN SYSTEMATIC ERRORS

It is desirable for clock propagation processes to have systematic errors reduced during the propagation process. Such errors contribute to track misalignment and/or rotation of the pattern with respect to a fixed frame. The most obvious systematic error, as described in IBM Technical Disclosure Bulletin, Vol. 33, No. 5 (October 1990), is the electronic delay in the read to write circuitry. However, the prior art does not teach that radial varying systematic errors (which change with radial position) due to geometric effects which are particular to a head and actuator design are present. If these errors are not compensated, they can reduce the track to track accuracy of the propagation process and can accumulate to result in rotation of the pattern with respect to an index (fixed reference). This rotation is shown graphically in FIG. 8, where each TP 800 on a subsequent servo track is displaced from the previous servo track due to a systematic error causing both pattern rotation and a fixed track to track misalignment error.

In the case where the pattern rotation matches the trajectory of the actuator during a seek, no shift in timing relative to the index related to the rotational orientation of the disk relative to the base plate (which does not change with radial position) will be present. This is the desired pattern rotation since it simplifies the disk file servo during long seeks. Thus, patterns which are written in such a manner as to have no timing shift relative to an index related to the rotational orientation of the disk will necessarily be of the desired type. Several examples of systematic errors are described below, but it should be understood that other similar effects can result from particular head and disk drive design. In general, for a given systematic error, there are three techniques which can be used to remove the systematic error:

1) Measurement of the error at one or more known radii which are used to compute the correction term at each propagation step;
2) In-process correction of the error by internal measurements during the propagation process; and
3) Measurements of the error in the disk file, by external means, which are used to correct all disk drives of similar design.

RADIAL DEPENDENT TIME DELAY FOR INDEPENDENT READ/WRITE SENSORS

Figure 5A:
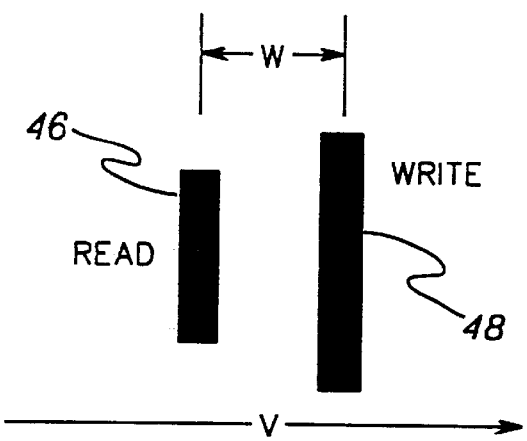
FIGS. 5a–5c show how the physical separation of read and write elements results in a time delay.
Figure 5B:
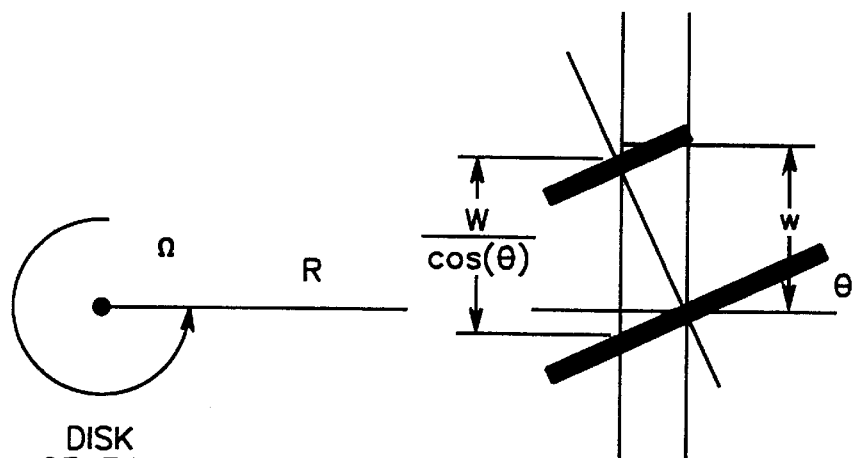

The dual revolution timing pattern process described in U.S. Pat. No. 5,485,322 is modified when the recording transducer has write and read elements which are separate as shown in FIG. 5a. In this case, a time delay or advance (relative to the case where the write and read elements are not separate) is required to write a second trigger pattern a specified physical distance after a readback trigger pattern. This time delay is a function of the disk linear velocity given by:

$$W/V$$

where W is the separation between read element 46 and write element 48, and V is the disk linear velocity. Further, in the case where the head is skewed relative to the track, as for example, would occur on a rotary actuator, the "apparent" separation W of the read and write transducers, as projected along the recorded track, is modified by the cosine of the skew angle of the recording head and will also vary as a function of radius (see FIG. 5b). The time delay due to the separation effect is given by:

$$DELAY_{Separation} = \frac{W}{\cos(\theta)\Omega R}$$

where θ is the skew angle of the recording head, Ω is the disk rotation speed, and R is the radius of the track.

Figure 5C:
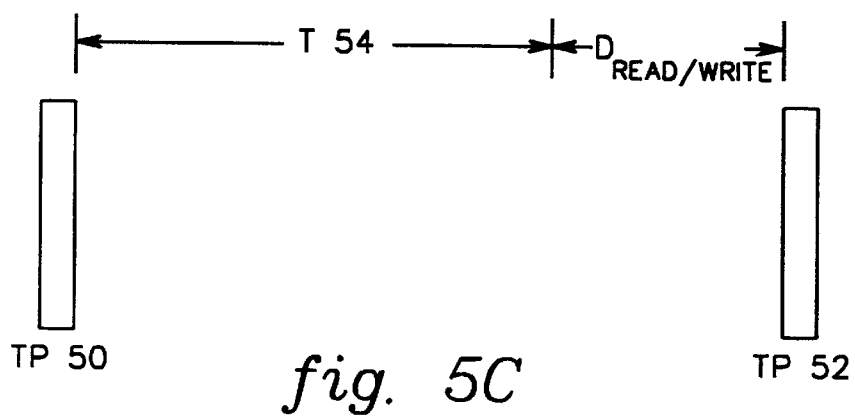

The read to write separation W can be measured, for example, using the product data head by writing a TP 50 (FIG. 5c), triggering on that trigger pattern on a subsequent revolution and writing a second trigger pattern TP 52, a time T54 later. Subsequent measurement of the actual time between the two trigger patterns is equal to the time T54 plus any delay in the electronics (which is fixed) and the delay due to the physical read to write separation W.

Repeating this measurement at two known radii (R$_1$ and R$_2$), possibly the innermost accessible data track or inner radius (ID) and the outermost accessible data track or outer radius (OD), with a known skew angle can be used to compute the separation between the read and write elements. The measured total delay is given by:

$$RW_{Delay1} = \frac{W}{\cos(\theta_1)\Omega R_1} + Delay_{electronic}$$

$$RW_{Delay2} = \frac{W}{\cos(\theta_2)\Omega R_2} + Delay_{electronic}$$

where this total delay referred to as the read to write delay, includes a delay due to the read to write separation and an additional delay due to the electronics path in either or both the read and write chain of the recording head.

The above relationships can be solved for W as given by:

$$W = \Omega X \left[ \frac{RW_{Delay1} - RW_{Delay2}}{\frac{1}{\cos(\theta_1)R_1} - \frac{1}{\cos(\theta_2)R_2}} \right].$$

The delay for each propagation step can then be computed and updated as the timing pattern is propagated across the disk surface (i.e., technique #1 of systematic error removal).

Alternatively, as noted in technique #2, the read to write delay can be measured during the propagation process and used to correct for the variable delay. For the case of the dual revolution timing pattern process, a measurement of the delay and correction values (e.g., HFM, HFS, HFC and SD where gp, gd and gi (each of which is explained later below) are set to 0) is available on each readback measurement revolution, which is described in the section "Process with Systematic Error Removal" below.

In some cases, it may be desirable to use measured delays to find the absolute radial position of the head. For a given disk file, the relationship between radial position of the head and the skew angle may be ascertained. Once the separation between the read and write elements is known, the electronic component of the delay may be determined by solving the above equation for the read to write delay at a given known radius. The same equation may now be solved to determine absolute radial position by using the read to write delay measured with the head at any other location.

READ TO WRITE NON-PARALLELISM

Figure 6A:
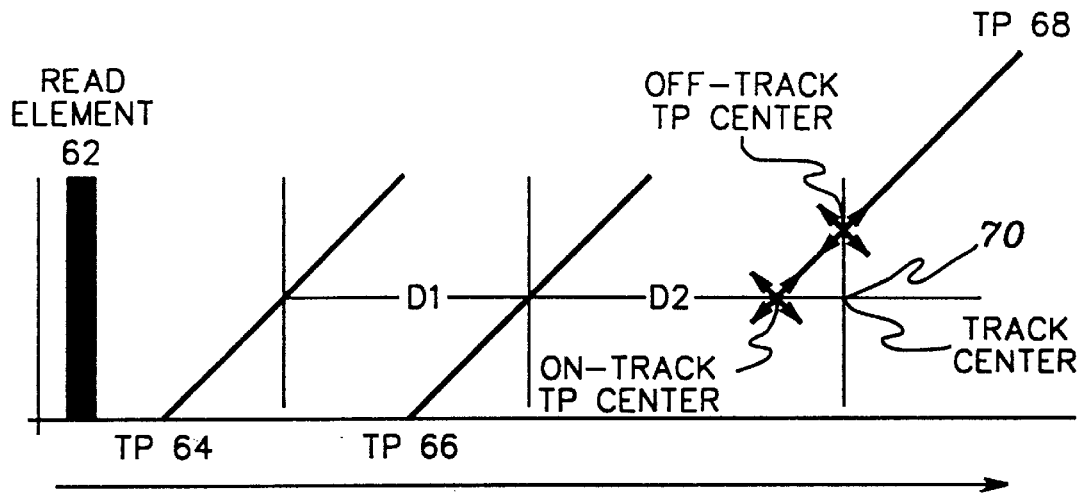
FIGS. 6a–6b show how a non-parallel read/write head results in an apparent shift of the trigger pattern when the head is moved off track center.
Figure 6B:
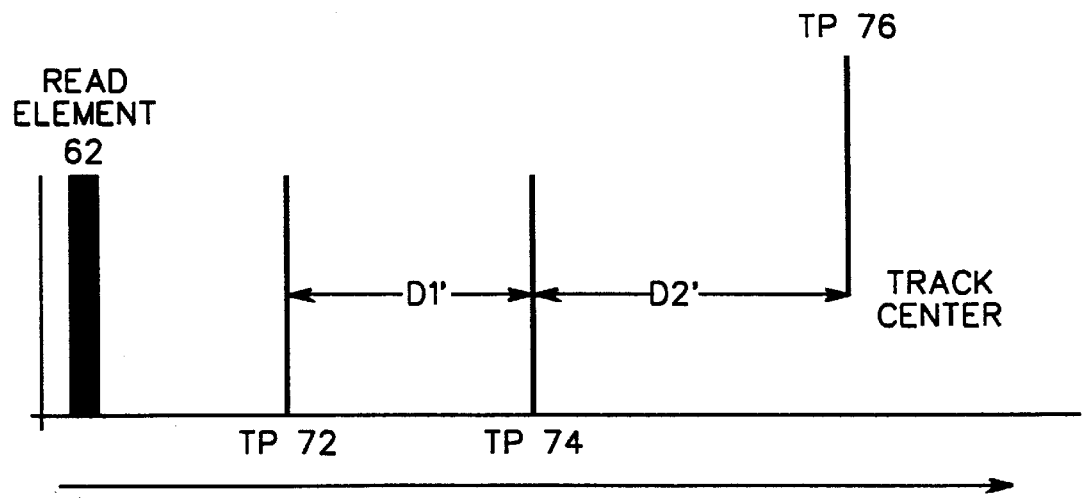

An additional systematic error occurs if the read element of a recording head is non-parallel to the writing element. This is shown in FIG. 6a where the written trigger patterns, TP 64, TP 66, and TP 68 are non-parallel to read element 62. TP 68 is written approximately one half off-track from TP 64 and TP 66. When read element 62 on track center 70 reads the trigger patterns, the time interval measured between TP 64 and TP 66 is given by D1. The time interval measured between TP 66 and TP 68 is equal to D2. The time interval D2 will be longer than D1 due to the fact that TP 68 is off track and its angle results in a shift in the apparent center of the trigger pattern. To further clarify this effect, when the read and write elements are parallel as shown by trigger patterns TP 72, TP 74 and TP 76 (FIG. 6b) the measured intervals per the above description result in the two measured intervals D1' and D2', which are equal. It should be noted that any non-parallelism between the read element and the written transition will cause this effect and it need not be limited to a constant angle between the read and write elements. Specifically, a bending or warping of the written transitions arising from edge effects in the write process will produce this effect.

This error can be removed during the propagation process by measuring the systematic error of intervals comprised of both on-track trigger patterns versus those intervals with one on-track and one off-track signal and storing the value.

Alternatively, as noted in technique #2, this error can be measured during the propagation process, as a separate periodic measurement step. In particular in the case where the read and write elements have a more complex geometric misalignment rather than simply non-parallel, then the delay may depend non-linearly on radial location. Correction of the effect would require periodic measurement during the propagation process.

Figure 7A:
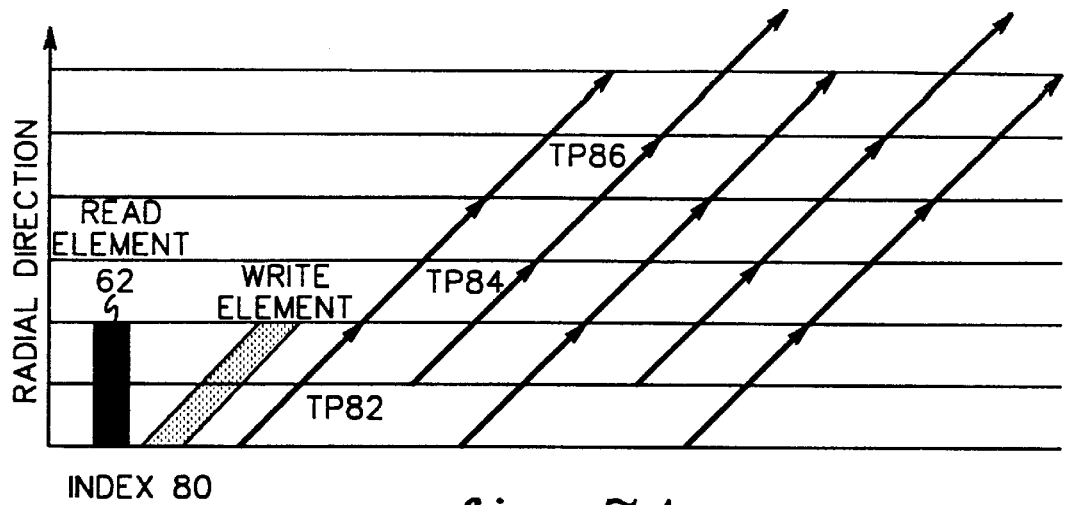
FIG. 7a shows non-parallel read and write elements resulting in pattern rotation.

This geometric effect can create a pattern spiral which is shown in FIG. 7A. Trigger patterns TP 82, TP 84 and TP 86 are aligned to minimize the track to track misalignment of the pattern, but the result is a rotation of the pattern from Index 80 in the time domain. Pattern rotation can be reduced by using a once per revolution index (i.e., an index fixed to an absolute frame, e.g., a motor index), as described in the "Process With Systematic Error Removal" below.

MISALIGNED HEAD MOUNTING

Figure 7B:
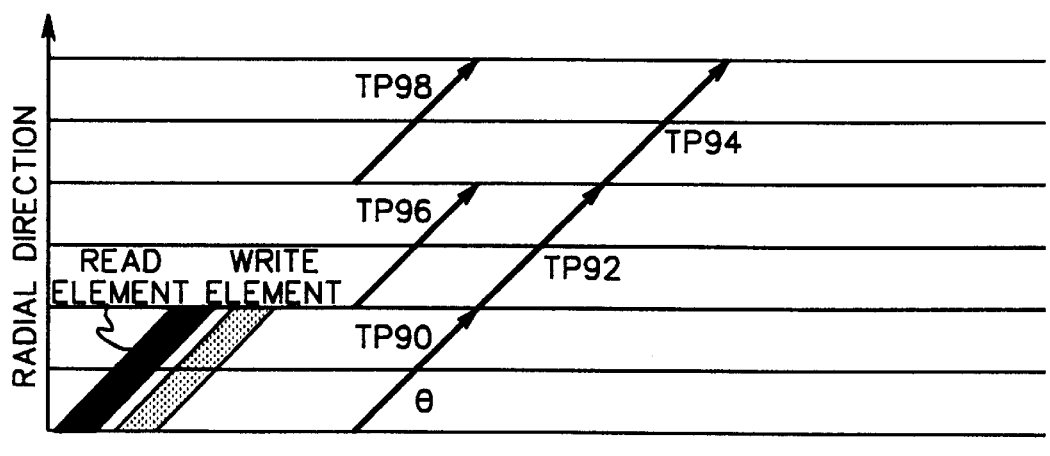
FIG. 7b shows a misaligned head mounting resulting in pattern rotation.

An additional geometric effect can occur if the recording head is non-parallel to the direction of actuator motion. When the trigger patterns are aligned to minimize the track to track error, a pattern rotation will result. A simple example is shown in FIG. 7B, in which a head is non-parallel to is the motion of a linear actuator. When the trigger patterns TP 90, TP 92, and TP 94 are aligned, a pattern rotation occurs. Removing the pattern rotation shown by TP 90, TP 96 and TP 98 results in a track to track misalignment. A similar effect occurs when a head is misaligned on a rotary actuator.

PROCESS WITH SYSTEMATIC ERROR REMOVAL

Figure 8:
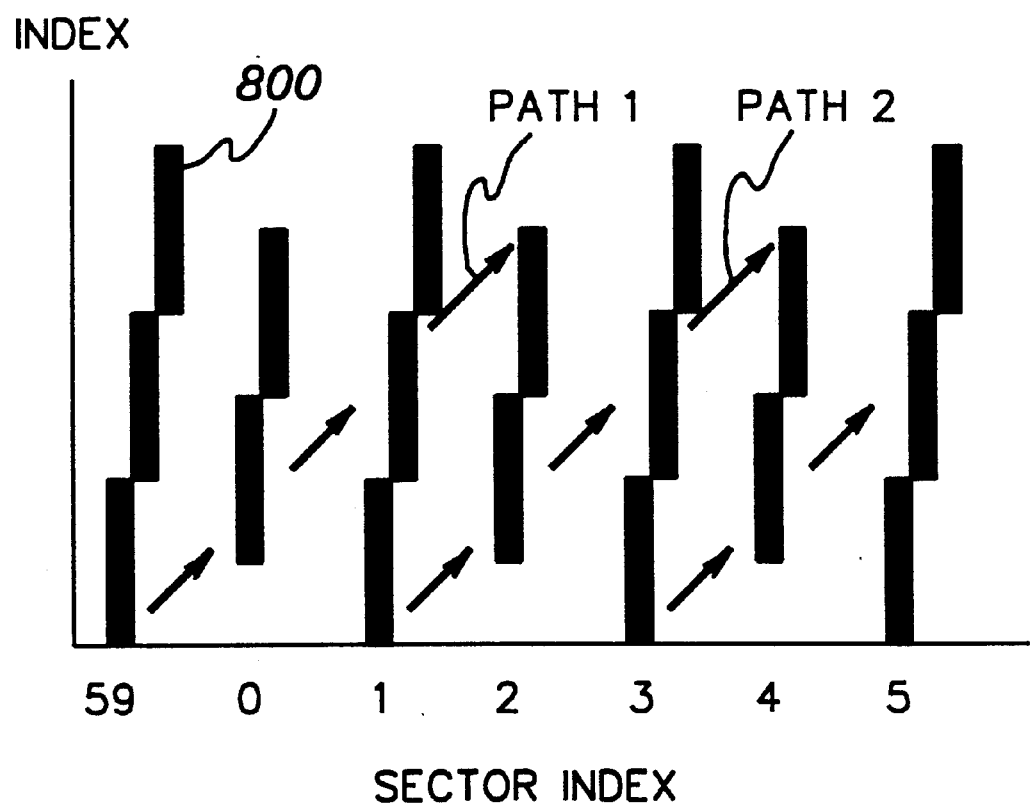
FIG. 8 shows the effect of systematic errors on pattern propagation.

In the propagation process shown in FIG. 2a, the odd numbered sectors are used for synchronization in writing the subsequent even numbered sectors and on the next step (after moving the head a short distance radially), the roles are reversed, with the even numbered sectors used for synchronization in writing the subsequent odd numbered sectors. Although the growth of random errors is removed by the measurement feedback process, a systematic error can result in a fixed track to track error and in a rotation of the entire servo pattern with respect to a fixed reference frame. This is shown in FIG. 8 where subsequent written trigger patterns are displaced a fixed distance from the previous servo track due to a systematic error.

Figure 9:
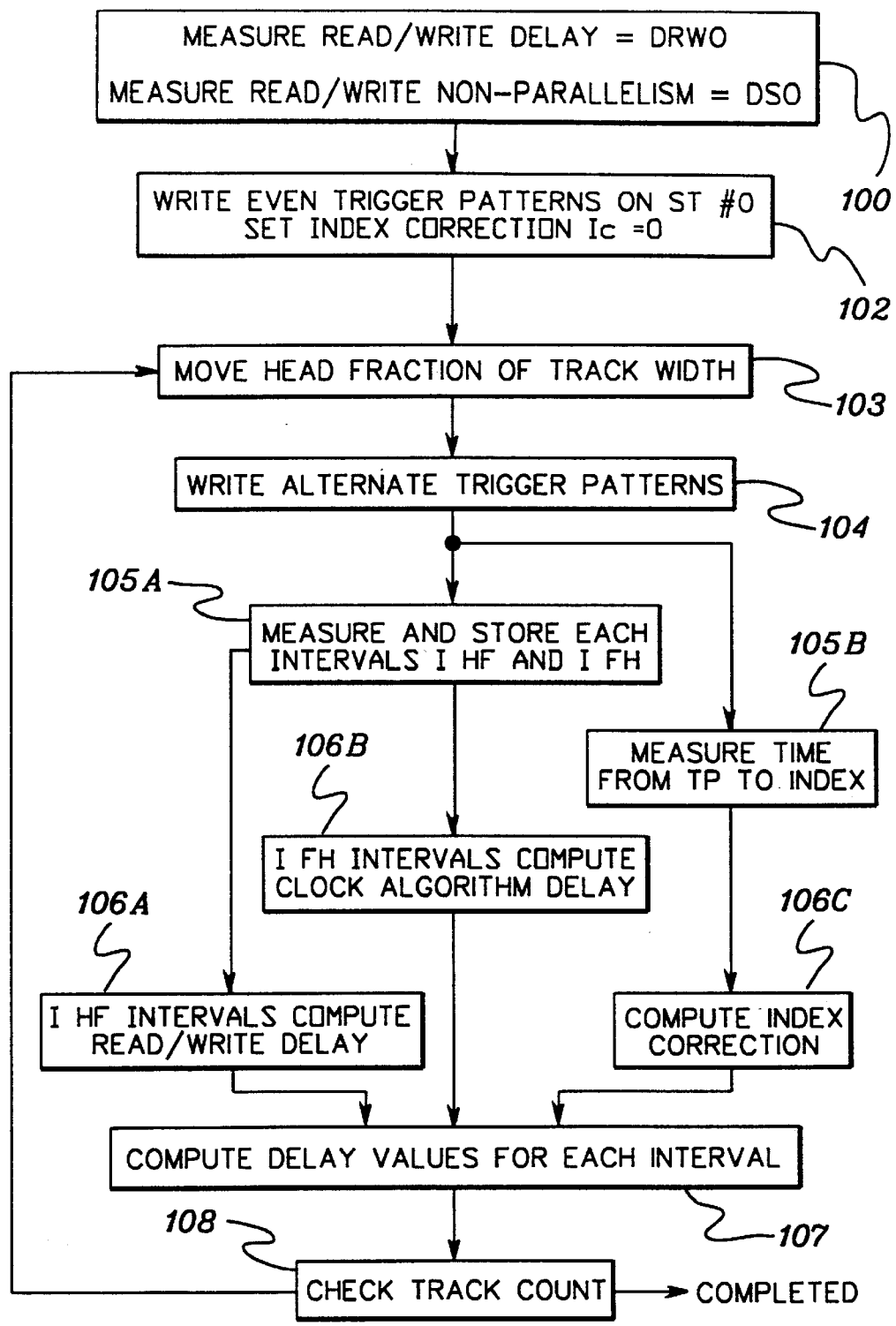
FIG. 9 shows one example of a process to reduce systematic error and control pattern rotation, in accordance with the principles of the present invention.

One embodiment of a flow chart in which systematic errors are reduced and the growth of random errors are controlled is shown in FIG. 9 and described below.

STEP 100) The process is initiated by writing a sequence of trigger patterns and measuring the delay is between read and write, as previously described, and storing the delay as a variable $D_{RWO}$. The TP shift due to read/write parallelism is checked and measured and stored as $D_{SO}$.

STEP 102) The read to write delay determined from STEP 100 is used to write, for instance, the even numbered TPs on the disk on, for instance, servo track number 0. The location of the first TP with respect to the index is recorded and the index correction is set to zero.

STEP 103) The head is moved a fraction (e.g., ⅓) of the track width.

STEP 104) The alternate numbered TPs are written. This is initially, for instance, the odd TPs, but will alternate between even and odd on successive propagation steps.

STEPS 105) Every interval corresponding to the time between trigger patterns is measured.

At STEP 105A, the intervals are divided into two groups, Interval Full to Half ($I_{FH}$) and Interval Half to Full ($I_{HF}$). The $I_{FH}$ corresponds to a time interval beginning with a full on-track TP and ending with an off-track TP. The $I_{HF}$ corresponds to a time interval beginning with an off-track TP and ending with an on-track TP. Combined these account for all the intervals on the disk. Each interval is measured using, for instance, a time interval analyzer.

At STEP 105B, the location of the first TP in the group written with respect to the rotational index is recorded using, for example, a time interval analyzer, during the same revolution of the disk.

STEPS 106) The measured intervals are used to calculate the time delay corrections.

At STEP 106A, the $I_{HF}$ are used to determine the read to write delay to be used in the next TP write.

At STEP 106B, the $I_{FH}$ are input to the clock algorithm and corrections are computed to eliminate the random growth of errors in the next TP write. Elimination of the random growth of errors is described in detail in commonly assigned U.S. Pat. No. 5,485,322, issued Jan. 16, 1996, entitled "Method And System For Writing A Clock Track On A Storage Medium," which is hereby incorporated herein by reference in its entirety.

At STEP 106C, the location of the first TP to the index is used to compute a new index correction to prevent the rotation of the pattern with respect to index. It should be noted this feature may be disabled for example to minimize track to track error by allowing the pattern to rotate as in FIGS. 7a–7b. The index can be obtained from the current waveform in the DC brushless motor typically used in disk drives or from any other available once-per-revolution signal derived from the orientation of the disk relative to the base plate of the drive. In one example, the index correction is equal to a predetermined desired time interval (e.g., 50 microseconds) minus the recorded time interval (between the index and the first TP).

STEP 107) The outputs of each of the above described processes in STEPS 106A, 106B and 106C are used to compute the desired delay to write the alternate trigger patterns at the next radial location. This is described in further detail below.

STEP 108) The servo-track count is checked to determine the end of the process (e.g., 18,000 servo-tracks).

If the process has not ended, the process loops back to STEP 103.

In the above process, in practice, one may average the measurements of the systematic errors on two or more subsequent servo-tracks prior to making corrections to the computed delay values for each interval.

Another example of reducing systematic and random errors in a pattern propagation process is described in detail below with reference to FIGS. 10–18. In one embodiment, the logic within those figures is performed by one or more controllers (e.g., a controlling unit), such as timing propagation controller 318 (FIG. 3a). For example, many of the calculations and comparisons are performed by one or more processors (e.g., a processing unit) of the controller. Further, the time measurements are performed by, for example, either the time interval analyzer or the motor index in combination with the counter within the processor, as described herein. Additionally, the programmable delay is used, as one example, to shift location of patterns.

In another embodiment, many of the calculations and comparisons are performed by one or more computing units, which may or may not be a part of controller 318 or any controlling unit. In one instance, a computing unit is a processor. In further embodiments, other components may be used to perform the below-described functions and these components may or may not be a part of controller 318 or any controlling unit. For instance, a measuring unit can be used to measure time intervals, and the measuring unit may or may not be a part of controller 318 or any controlling unit. As a further example, a processing unit (e.g., one or more processors) that is not considered a part of the controller or controlling unit may be used to perform at least a portion of the logic within controller 318.

Figure 10:
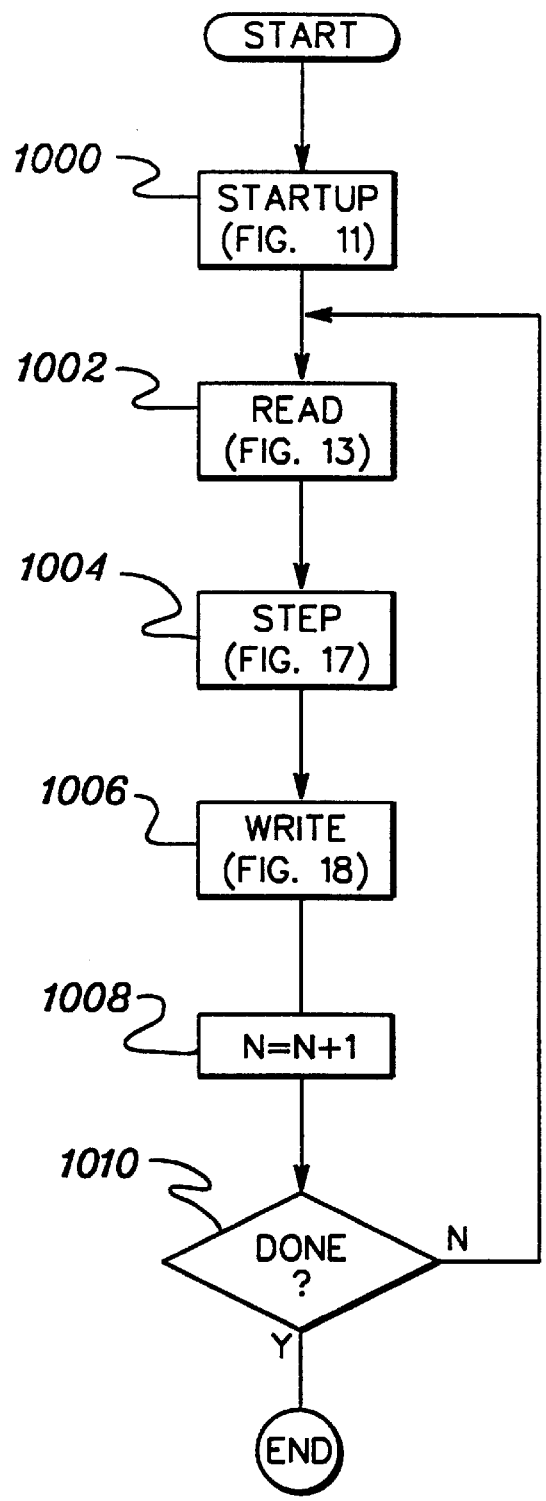
FIG. 10 depicts one example of a block diagram of the processes used to reduce systematic and random errors in a pattern propagation process, in accordance with the principles of the present invention.
Figure 11:
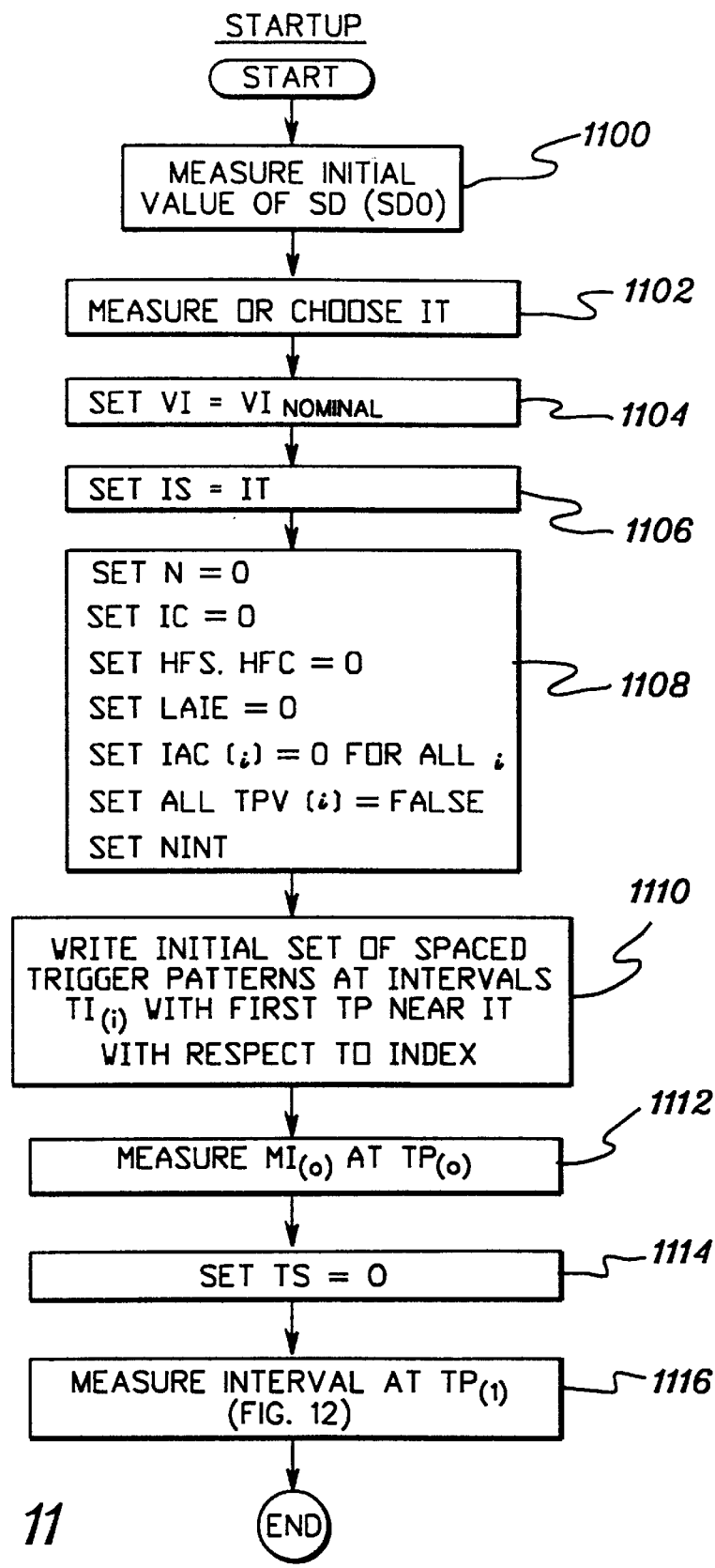
FIG. 11 is one embodiment of the start-up procedure shown in FIG. 10, used to initialize various variables to be used during the systematic and random error reduction process of the present invention.

Referring to FIG. 10, initially a start-up procedure is implemented, which is used to initialize various variables to be used during the systematic and random error elimination process, STEP 1000. One example of a start-up procedure is described in detail with reference to FIG. 11. An initial value of the read/write delay (systematic delay (SD0)) is measured in a manner described above with reference to FIG. 5c, STEP 1100. Additionally, a value for a target index time (IT), which represents the target interval between the index (e.g., the motor) and the first trigger pattern, is either measured or chosen, STEP 1102. In one embodiment, IT is set to 50 microseconds.

Further, a value for a valid interval window (VI) is set equal to a valid interval window nominal value ($VI_{nominal}$), such as, for instance, 35 nanoseconds, STEP 1104. The valid interval window is used as an error check; in particular, it defines how far away from the anticipated trigger location an actual measured trigger pattern can be to conclude that it is valid. Also, an estimate of a current index location (IS) is set to the target index time, which is updated as the technique proceeds along to the target, STEP 1106.

In addition to the above, a number of other variables are initialized, STEP 1108. In particular, a step value (N) is set equal to zero. In one example, there are 18,000 steps. Further, an index correction value is set equal to zero, as well as a half to full estimate (HFS) and a half to full correction (HFC). Additionally, a local average interval error (LAIE) is set to zero, as well as an integral algorithm correction (IAC) for all i. A trigger point valid flag is set to false for all of i and a value representing the number of equally spaced trigger patterns (Nint) is set equal to 90, as one example. As used herein, all index i are assumed to be modulo and can range from zero to Nint−1 (i.e., eighty-nine).

After the above values are initialized, an initial set of equally spaced trigger patterns (Nint) are written at intervals $TI_i$ with the first trigger pattern near the target index time with respect to the index, STEP 1110. All $TI_i$ are equal to the target average interval (TAI) to start with, which is the nominal revolution time divided by the number of intervals in a revolution.

Subsequently, a measured interval ($MI_0$) is measured at trigger pattern zero using, for instance, a time interval analyzer, STEP 1112, and a variable referred to as TS (time slip) is set to zero, STEP 1114. This value represents an error handling variable that keeps track of the magnitude of the error in an erroneous trigger. This logic assumes the existence of hardware, which generates a fake trigger pattern if a valid or erroneous trigger pattern is not received within a specified time; i.e., trigger patterns valid, erroneous or fake are generated near every anticipated trigger pattern location. In the beginning, it is assumed there are no errors and therefore, TS is set to zero. Thereafter, an interval (MI) is measured at trigger pattern 1, STEP 1116, as described in detail below.

One embodiment of measuring intervals at trigger pattern one ($TP_{(1)}$) is described in detail with reference to FIG. 12. Initially, the interval at $TP_i$ where i is equal to 1 is measured using, for example, the time interval analyzer, STEP 1200. (That is, the interval between $TP_{(0)}$ and $TP_{(1)}$ is measured.) Thereafter, the measured interval is corrected for previous invalid trigger patterns, STEP 1202. This is accomplished by setting $MI_i$ equal to $MI_i$+TS (i.e., $MI_i=MI_{(i)}$+TS). Since the first trigger pattern is assumed to be valid, TS is set to zero and no correction is made.

Next, a determination is made as to whether the immediately corrected value of $MI_i$ minus the value of the target interval ($TI_{(i)}$) is greater than the valid interval window (VI), INQUIRY 1204. If $|MI_i-TI_i|$ is greater than the valid interval window, then $MI_{(i)}$ is considered to be invalid. Thus, the value of time slip (TS) is set equal to $MI_i-TI_i$, and the trigger pattern valid flag ($TPV_{(i)}$) is set to FALSE, STEP 1206. Thereafter, another inquiry is made as to whether the valid interval window is greater than a maximum value that has been set ($VI_{limit}$), INQUIRY 1208. If the valid interval window is greater than the maximum (e.g., 700 nanoseconds), then the process for measuring the interval at the first trigger pattern is complete, STEP 1218. However, if the valid interval window is less than or equal to the maximum, then the valid interval window is increased by a valid interval increment ($VI_{inc}$), STEP 1210 and the measurement of $MI_i$ is complete. One example of a value for the valid interval increment is 35 nanoseconds.

Returning to INQUIRY 1204, if the measured interval is valid, then the time slip is set equal to zero, the trigger pattern valid flag is set equal to TRUE and the valid interval window is set equal to the nominal value ($VI_{nominal}$), such as, for instance, 35 nanoseconds, STEP 1212.

Subsequently, the trigger pattern valid flag for interval i−2 is checked to see if the trigger pattern at that location was valid, INQUIRY 1214. If it was not valid, then again the measured interval process is complete and the local average interval error (LAIE) is left unchanged, STEP 1218. However, if the trigger pattern at that location is valid, then the local average interval error (LAIE) (i.e., the velocity error) is updated, STEP 1216.

In one example, the local average interval error is computed as follows:

$$LAIE=LAIE+q\times\{([MI_{(i)}+MI_{(i-1)}-TI_{(i)}-TI_{(i-1)}]\div2)-LAIE\},$$

where q represents a value, which determines how fast the LAIE is going to track the difference between actual interval measurements and expected nominal velocity interval measurements, and is equal to a fraction such as 0.1.

Figure 13:
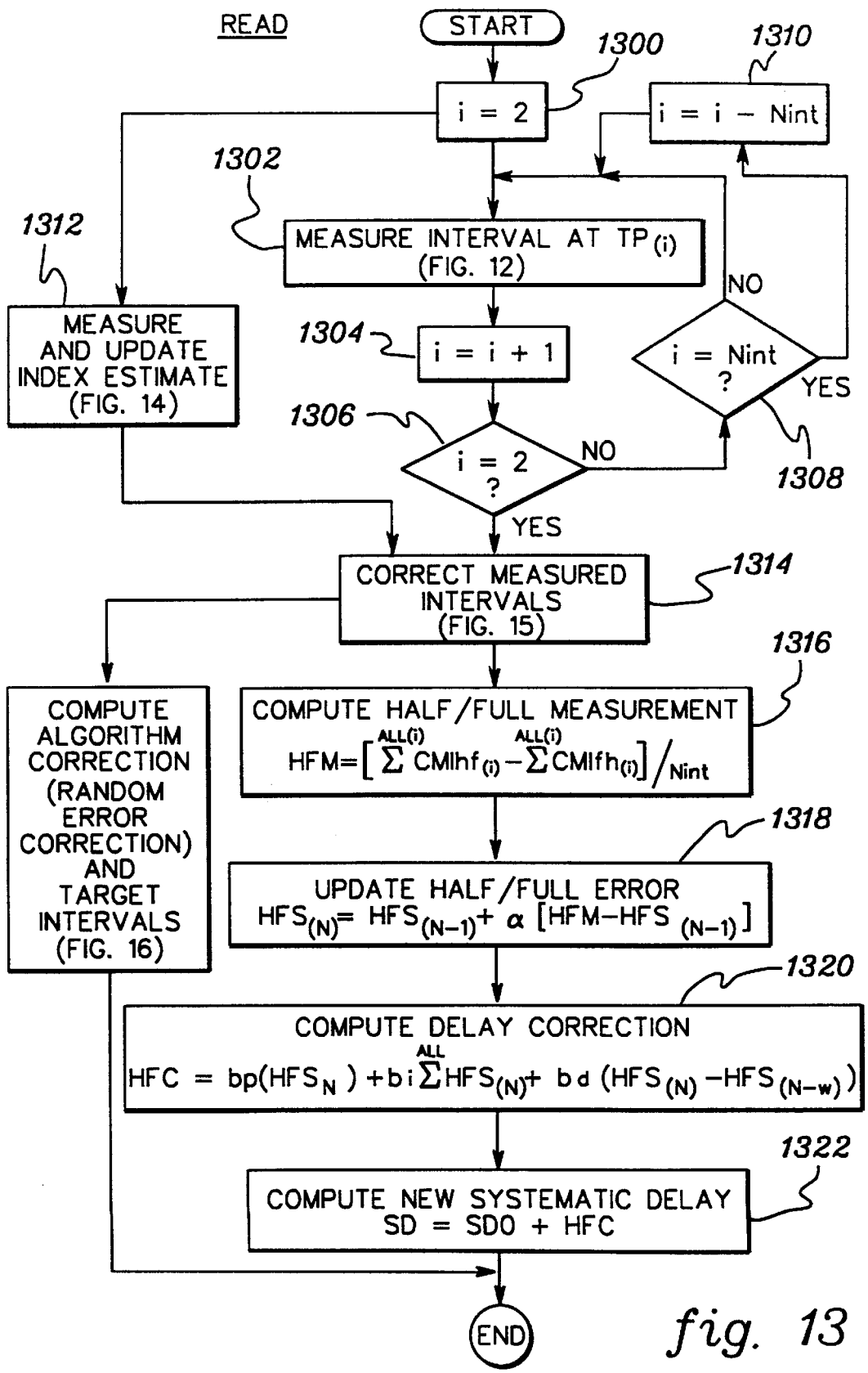
FIG. 13 depicts one embodiment of the read procedure depicted in FIG. 10, in accordance with the principles of the present invention.

Subsequent to updating the local average interval error, the process for measuring the interval at trigger pattern one is complete, as well as the start up procedure of FIG. 10. Therefore, processing proceeds with a read procedure, STEP 1002 (FIG. 10). One embodiment of the read procedure is depicted in FIG. 13 and described in detail herein.

Initially, index i is set equal to 2, since the read is going to read back the interval starting with i=2 and go around past zero to one, STEP 1300. Thereafter, the interval at trigger pattern two is measured, STEP 1302, in the manner described above for measuring the interval at trigger pattern one (see FIG. 12). Subsequent to measuring the interval, the index is incremented by one, STEP 1304, and an inquiry is made to determine whether the process is complete, i.e., whether i has reached 2, again, INQUIRY 1306. If i is not equal to 2, then a further determination is made as to whether i is equal to a value of Nint, INQUIRY 1308. If i is not equal to Nint, then processing continues at STEP 1302 "Measure Interval At $TP_i$." If however, i is equal to Nint, then i is recalculated by subtracting Nint from i, (i.e., i=i−Nint), STEP 1310. Thereafter, processing continues with STEP 1202 "Measure Interval At $TP_i$."

In addition to the above, sometime after STEP 1310, an index estimate (IS) is measured and updated. One embodiment for measuring and updating the index estimate is described in detail with reference to FIG. 14. Initially, the time interval between the index and the first available non-fake (i.e., valid or erroneous) trigger pattern after the index, which is usually either at $TP_0$ or $TP_1$, is measured using, for example, a time interval analyzer, STEP 1400. Further, a trigger pattern indice (TPind) is set equal to zero, STEP 1402. Subsequently, a determination is made as to whether the measurement (IM) of the interval between the index and the first available non-fake trigger pattern is greater than a target (IT) plus a variable IW (i.e., IM>IT+IW?), which reflects the allowed error from the target for the measurement to be considered valid, INQUIRY 1404. If IM is greater than this value, then the trigger pattern indice is incremented by one and IM is decremented by $TI_{(TPIND)}$, STEP 1406. Thereafter, processing returns to INQUIRY 1404, "IM>IT+IW?".

When IM is less than or equal to IT+IW, a check is made against the other end of the window. In particular, a determination is made as to whether IM is less than IT−IW, INQUIRY 1408. If IM is less than IT−IW, then the measurement is invalid and processing of the measurement and update of the index estimate (IS) is complete, STEP 1410.

However, if IM is not less than IT−IW, then the measurement may or may not be good. Thus, a determination is made as to whether the trigger pattern valid flag ($TPV_{TPIND}$) is equal to true. If it is not equal to true, then the measurement is invalid and processing is complete, STEP 1410. However, if the flag is set equal to true, then it is a good measurement and an index estimate (IS) is updated as follows:

$$IS=IS+f\times(IM-IS),$$

where f is a variable approximately equal to 0.1, which determines how fast IS is going to track IM. (In another embodiment, the above winnowing of STEPS 1402 and 1412 are not used to determine if the measured time interval is valid. Other procedures may be used. The index estimate is undated when the measured time interval is valid.)

After measuring and updating the index estimate, processing continues with FIG. 13. Specifically, after the index estimate is measured and updated and/or after a positive result is received from INQUIRY 1306, the measured intervals ($MI_{(i)}$) are corrected, STEP 1314.

Figure 15:
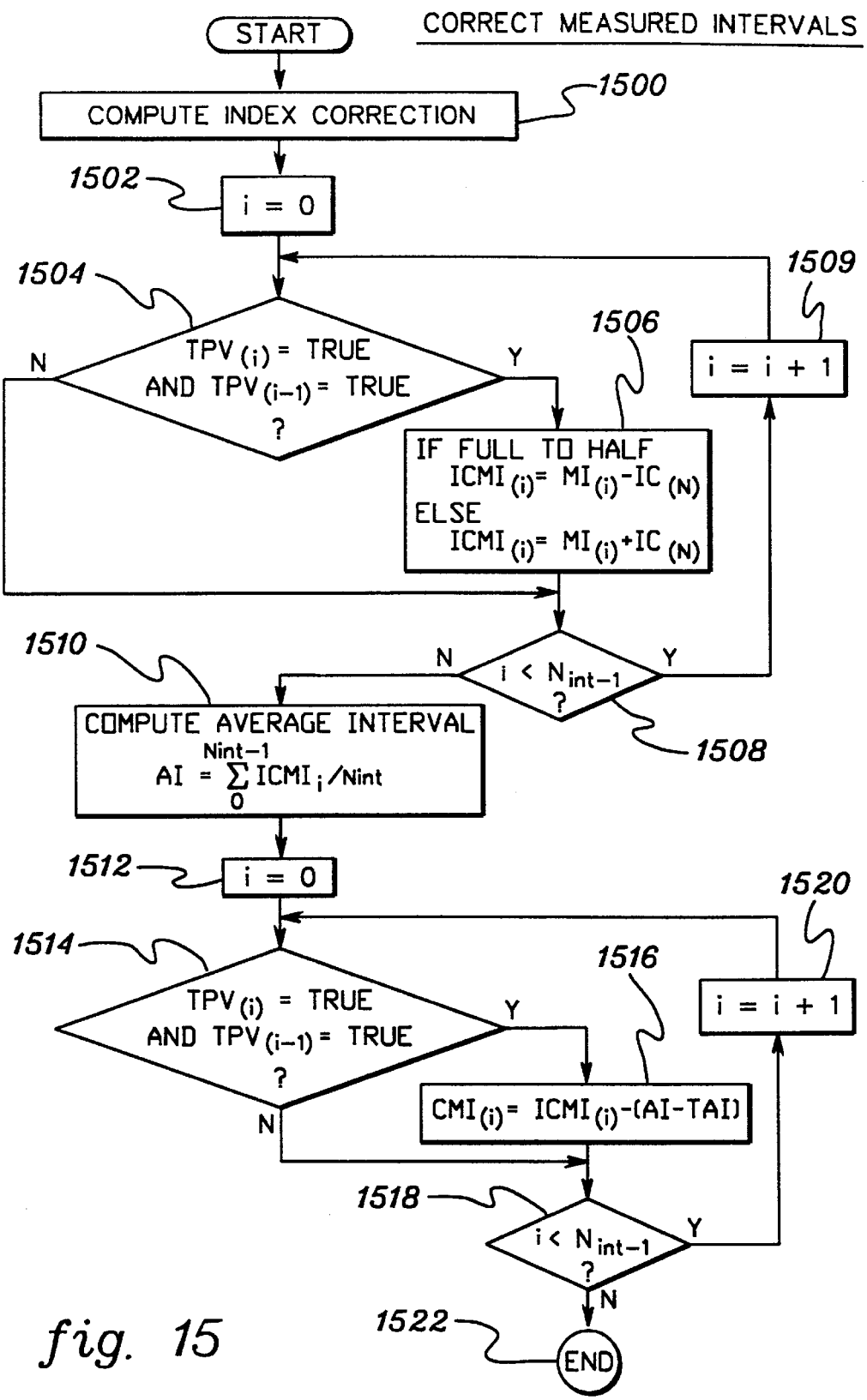
FIG. 15 depicts one embodiment of the logic used to correct measured intervals, in accordance with the principles of the present invention.

One embodiment for correcting the measured intervals is described in detail with reference to FIG. 15. In one example, the operations described within FIG. 15 are performed by one or more processors (e.g., a processing unit) of timing propagation controller 318. In another embodiment, the processing unit need not be a part of the propagation controller.

Referring to FIG. 15, initially, an index correction is computed, STEP 1500, as follows:

$$IC_n = gp \times (IE_n) + gi \times \sum_0^n IE_n + gd[IE_n - IE_{n-Q}]$$

where:

IC is equal to the index correction, which is indicative, e.g., of the location of a trigger pattern on the disk relative to the rotational index of the disk;

gp is equal to a proportional gain which is approximately 0.4, in one embodiment;

gi is equal to an integral gain which is approximately equal to, for instance, $6\times10^{-5}$;

gd is equal to a differential gain, which is approximately equal to, for instance, 0.01;

Q is a variable which reflects how many steps occur between the measurements, which are going to be used to determine the slope, and is equal to, for instance, 10; and $$IE_n=IS-IT.$$

After computing the index correction, the index variable i is initialized to zero, STEP 1502. Thereafter, a determination is made as to whether the trigger pattern valid flag at index i ($TPV_i$) and the trigger pattern valid flag at i−1 ($TPV_{(i-1)}$) are equal to TRUE, INQUIRY 1504. If both of these flags are true and the measured interval is full to half, then the index correction measured interval (ICMI) of i is computed, as follows:

$$ICMI_i=MI_i-IC_N.$$

However, if both of the flags are true and the measurement is half to full, then the index correction measured interval is equal to the following:

$$ICMI_i=MI_i-IC_N.$$

Subsequently, or if at least one of the trigger pattern valid flags is false, then a determination is made as to whether i is less than $N_{int}-1$, INQUIRY 1508. When i is less than this value, then i is is incremented by 1, STEP 1509, and processing continues for the next index with INQUIRY 1504. However, when i is greater than or equal to $N_{int-1}$, then an average interval is computed using the following equation, STEP 1510:

$$AI = \sum_{0}^{N_{int}-1} ICMI_i \div N_{int}.$$

Thereafter, i is set equal to zero again and another determination is made as to whether the trigger pattern valid flags at index i and at index i−1 are equal to true, INQUIRY 1514. When they are equal to true, then a corrected measured interval is computed as follows, STEP 1516:

$$CMI_i=ICMI_i-(AI-TAI).$$

After computing CMI or when at least one of the trigger pattern valid flags is invalid, a further determination is made as to whether i is less than $N_{int-1}$. When i is less than this value, i is incremented by 1, STEP 1520, and processing continues for the next index at INQUIRY 1514. However, when i is greater than or equal to $N_{int-1}$, then the corrected measured interval processing is complete, STEP 1522.

Returning to FIG. 13 and in particular STEP 1314, subsequent to correcting the measured intervals, two paths are taken, each of which is described below. One of the paths includes, for instance, computing a half/full measurement, as follows:

$$HFM = \left[\sum^{all(i)} CMIhf_{(i)} - \sum^{all(i)} CMIfh_{(i)}\right] / N_{int},$$

wherein CMIhf is the subset of the CMIs, which are measured from half to full; and CMIfh is the subset of the CMIs, which are measured from full to half.

Subsequent to calculating HFM, a half to full error (HFS) is updated by using the following formula, STEP 1318:

$$HFS_N=HFS_{N-1}+\alpha\times[HFM-HFS_{N-1}]$$

where α is equal to, for instance, 0.025.

Thereafter, a delay correction is computed as follows, STEP 1320:

$$HFC = bp(HFS_{(N)}) + bi\sum^{all} HFS_{(N)} + bd(HFS_{(N)} - HFS_{(N-W)}),$$

where w is equal to, for instance, 10.

Subsequently, a new systematic delay (SD) is computed by adding the delay correction to the initial value of the systematic delay (i.e., SD=SD0+HFC), STEP 1322. The new systematic delay adjusts where the trigger patterns on the next step are to be written. This ends the first path.

Figure 16:
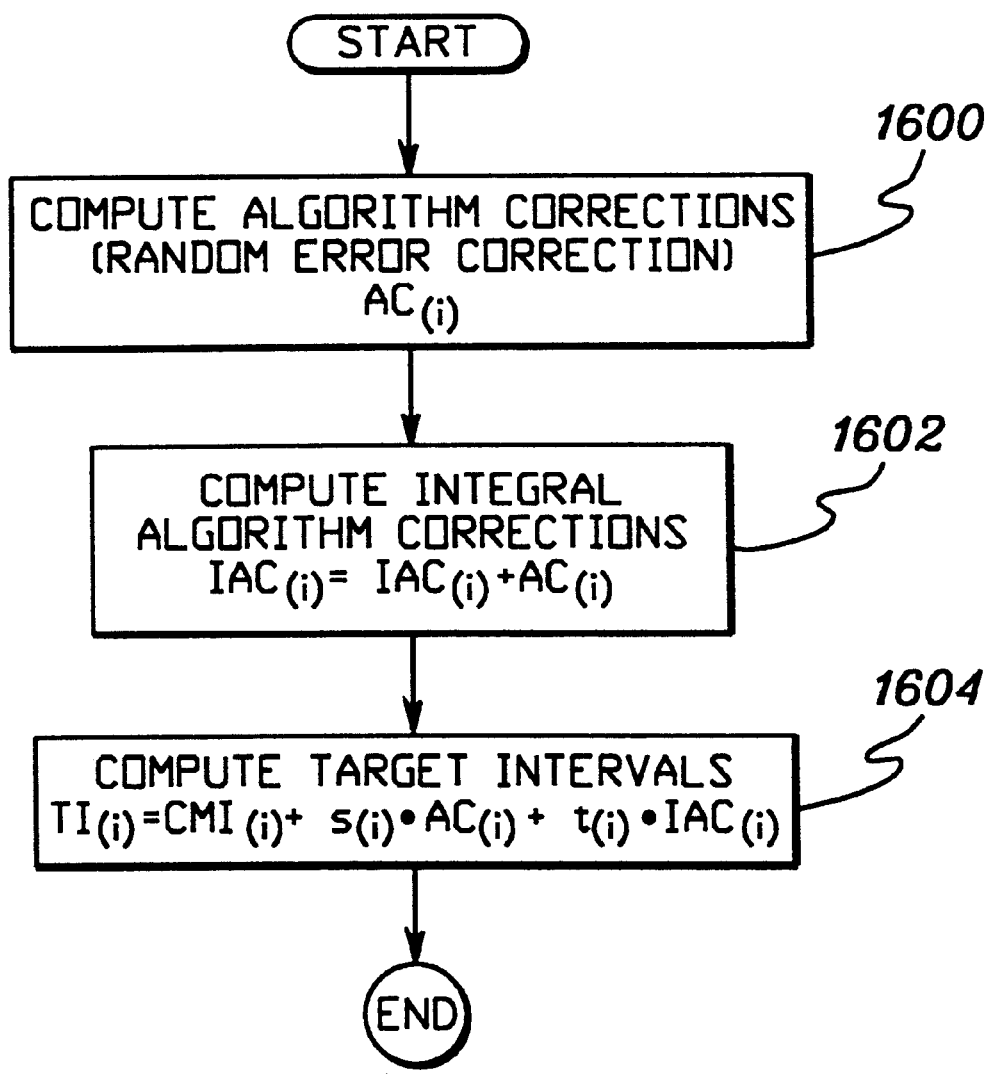
FIG. 16 depicts one embodiment of the logic used to compute algorithm corrections and target intervals, in accordance with the principles of the present invention.
Figure 17:
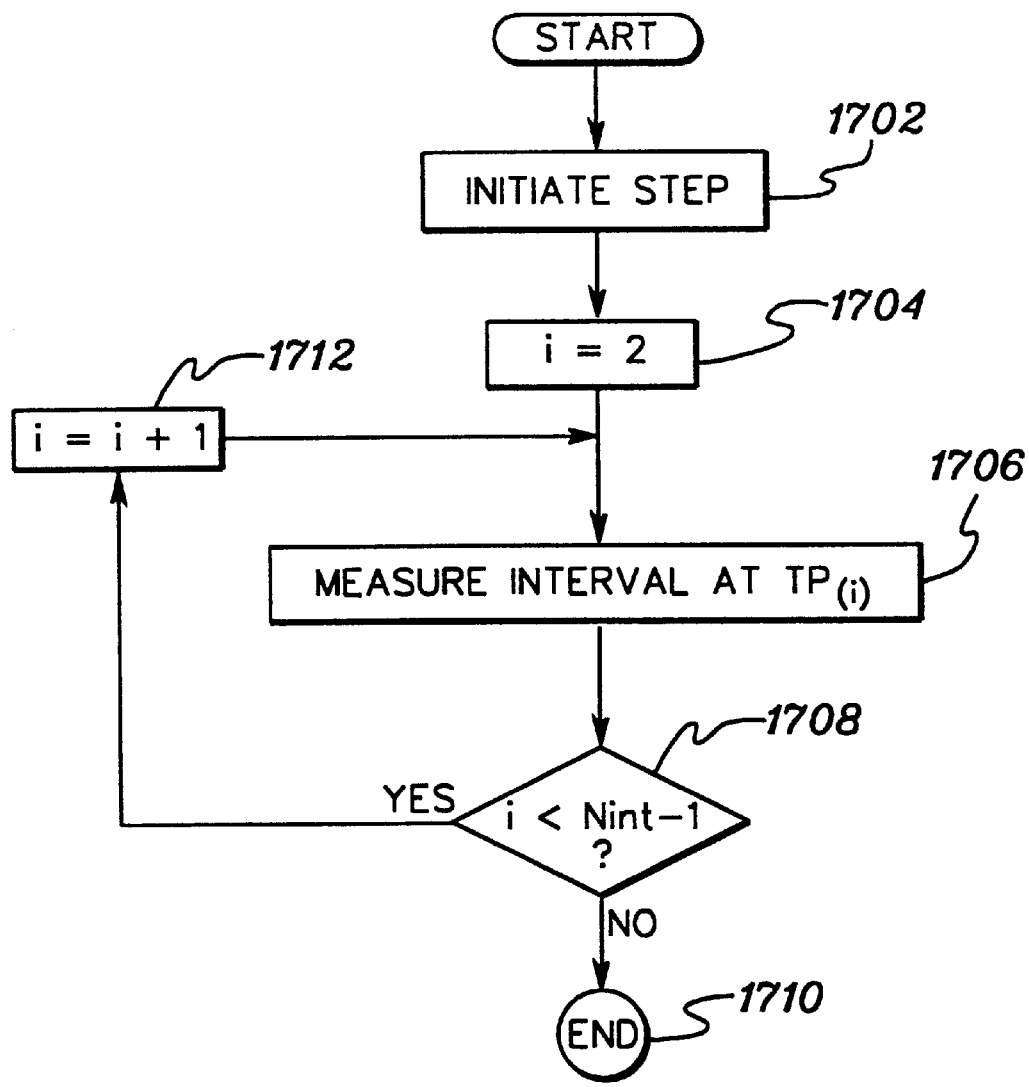
FIG. 17 depicts one embodiment of the logic used in the step procedure depicted in FIG. 10, in accordance with the principles of the present invention.
Figure 18:
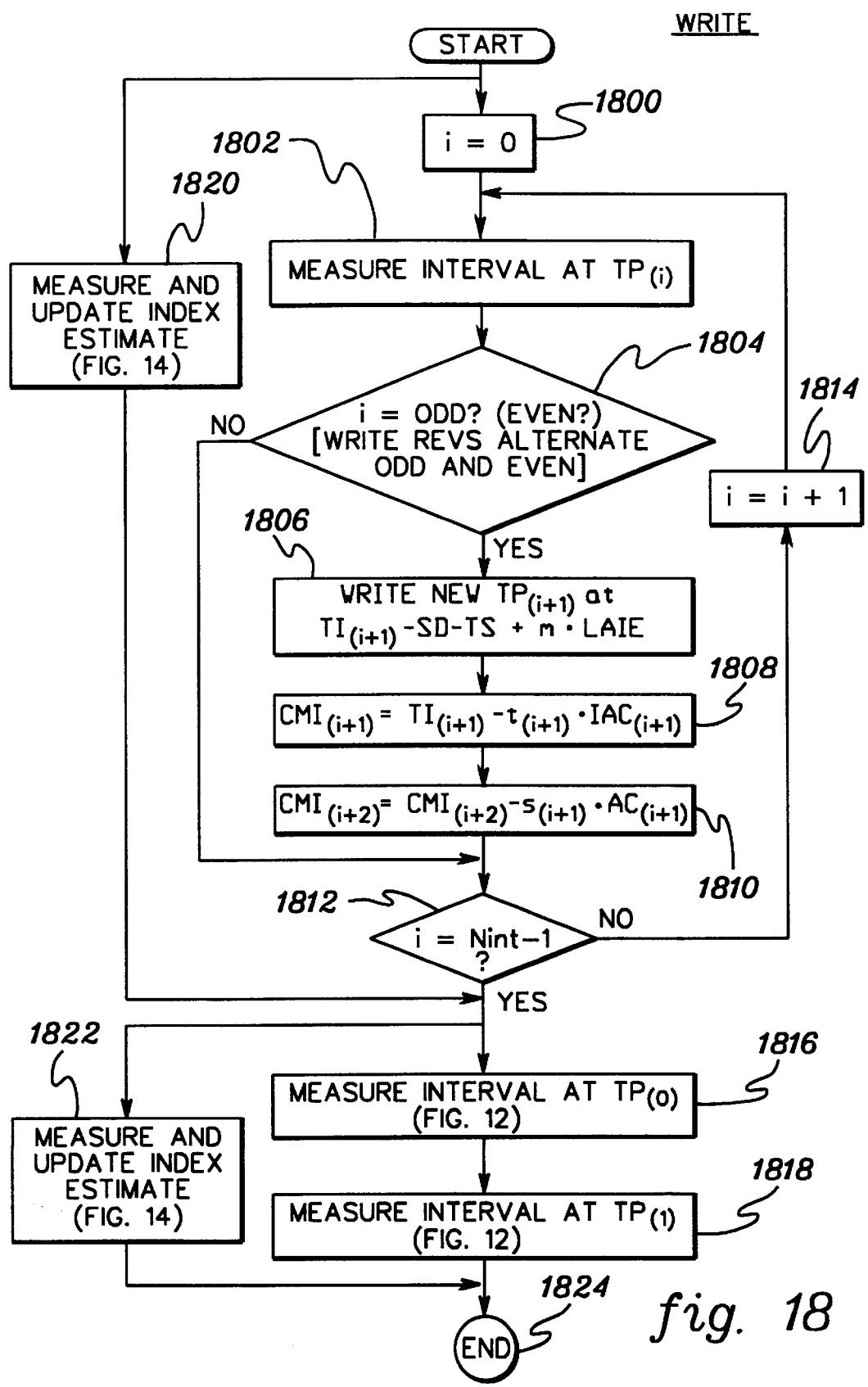
FIG. 18 depicts one embodiment of the logic used during the write procedure of FIG. 10, in accordance with the principles of the present invention.

The second path taken after correcting the measured intervals includes computing an algorithm correction (i.e., random error correction) and target intervals, which are described in detail with reference to FIG. 16.

In one embodiment, initially an algorithm correction ($AC_i$) is computed, STEP 1600. In one example, $AC_i$=(TAI−$CMI_i$)×a fraction, such as 0.3. (Algorithm correction is also described in commonly assigned U.S. Pat. No. 5,485,322, issued on Jan. 16, 1996, entitled "Method And System For Writing A Clock Track On A Storage Medium," which is hereby incorporated herein by reference in its entirety.)

Thereafter, an integral algorithm correction used in correcting circumferential systematic errors is computed using the following formula, STEP 1602:

$$IAC_i=IAC_i+AC_i.$$

Additionally, target intervals are computed, as follows, STEP 1604:

$$TI_i=CMI_i+s_i\times AC_i+t_i\times IAC_i,$$

where:
  $s_i$ are typically equal to 1; and
  $t_i$ are typically equal to 0.

Once these computations are made, processing of the compute algorithm corrections and target intervals, as well as processing of the read procedure is complete (see FIG. 13) and processing continues with STEP 1004 of FIG. 10.

In particular, a step procedure is performed in order to move to the next servo-track. One embodiment of the step procedure is described with reference to FIG. 17. Initially, a command to move the actuator to the next servo-track is sent to the system that moves the actuator (e.g., a radial propagation controller or a pusher), STEP 1702. Then, an index value, i, is set equal to 2, STEP 1704. Thereafter, a measurement is taken at trigger pattern i, STEP 1706. In particular, the interval at $TP_i$ is measured as described above with reference to FIG. 12.

Subsequent to measuring the interval, a determination is made as to whether i is less than Nint−1, INQUIRY 1708. If i is greater than or equal to Nint−1, then processing of the step procedure is complete, STEP 1710. However, if i is less than Nint−1, then i is incremented by 1, STEP 1712, and processing continues with measure interval at $TP_i$, STEP 1706.

Returning back to FIG. 10, in addition to the step procedure, a procedure to write trigger patterns on the next track (or the next radial position) is performed, STEP 1006. One embodiment of the write procedure is described in detail with reference to FIG. 18.

Initially, i is set equal to zero, STEP 1800, and then, the interval at $TP_i$ is measured, as described above, STEP 1802. Thereafter, a determination is made as to whether the index value is equal to odd or even. This will depend on whether the write revolution is triggering on odds and writing on evens, or vice versa. If the revolution is triggering on odds and i is equal to odd (or if the revolution is triggering on evens and i is equal to even), then a new trigger pattern is written with a delay of $TI_{i+1}$−SD−TS+m×LAIE, where m is equal to approximately 1.0, in one example.

Next, a corrected measured interval for i+1 is updated as follows, STEP 1808:

$$CMI_{i+1}=TI_{i+1}-(t_{i+1}\times IAC_{i+1}).$$

Additionally, $CMI_{i+2}$ is updated as follows, STEP 1810:

$$CMI_{i+2}=CMI_{i+2}-(S_{i+1}\times AC_{i+1}).$$

Thereafter, or if i is not equal to odd (or to even), then a determination is made as to whether i is equal to Nint−1, INQUIRY 1812. If i is not equal to Nint−1, then i is incremented by one at STEP 1814 and processing continues with STEP 1802 "MEASURE INTERVAL AT $TP_i$." However, if i is equal to Nint−1, then the interval is measured at $TP_0$ and $TP_1$, STEPS 1816 and 1818.

Figure 14:
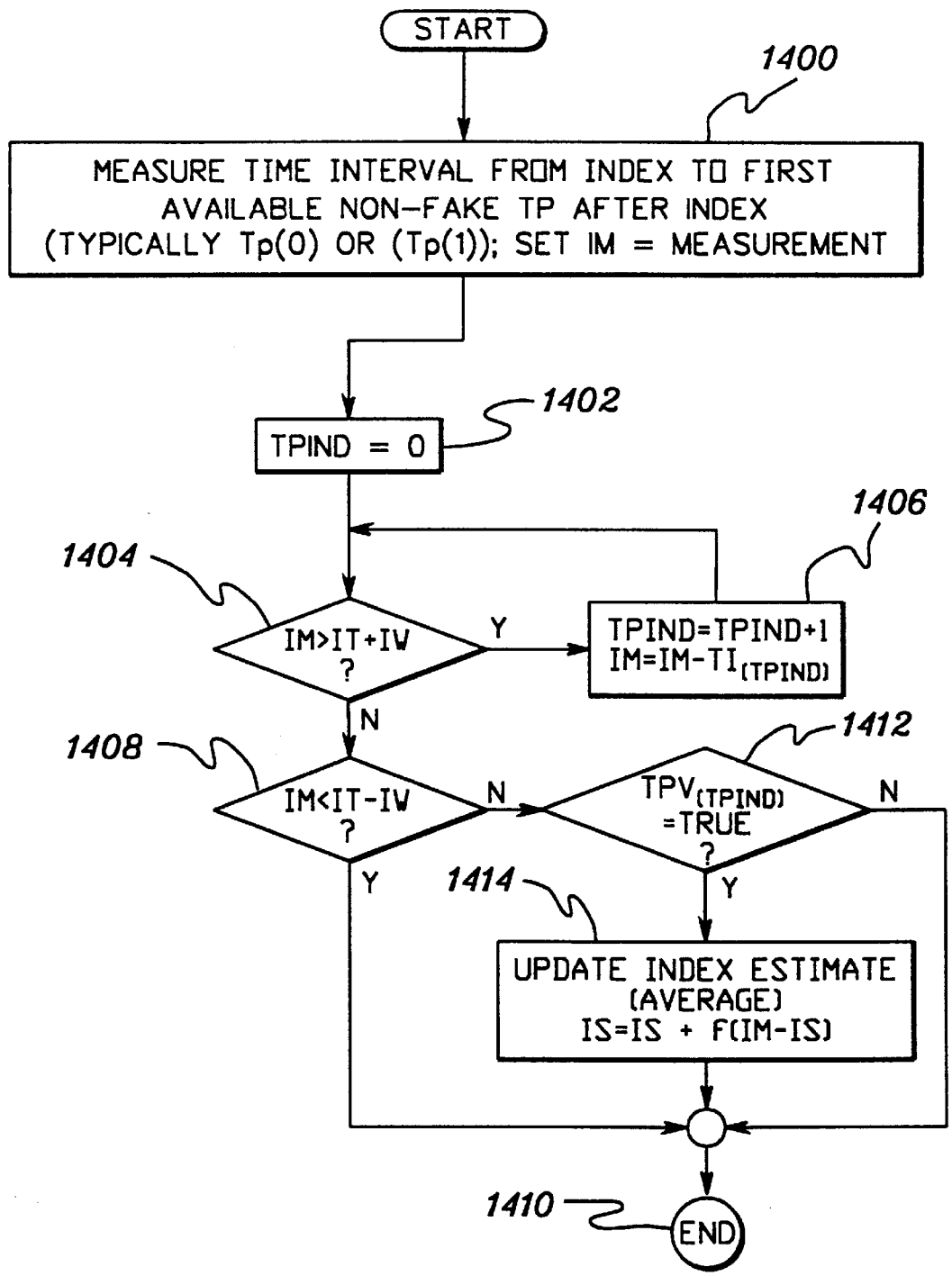
FIG. 14 depicts one embodiment of the logic used to measure and update an index estimate, in accordance with the principles of the present invention.

In addition to the above, sometime between STEPS 1800 and 1816, the index estimate is measured and updated, as described with reference to FIG. 14, STEP 1820. Thereafter, processing continues with STEP 1816. Further, sometime after STEP 1816 and before STEP 1310 of FIG. 13, the index estimate is measured and updated again.

Returning to FIG. 10, after the write processing is complete, then the step number is incremented by 1, STEP 1008, and a determination is made as to whether the processing is complete, INQUIRY 1010. If the processing is not complete, then flow returns to STEP 1002 "READ."

VELOCITY ERROR CORRECTION

Variations in the disk rotation speed will cause errors in the propagation process described above. In U.S. Pat. No. 5,485,322, it was taught that the magnitude of this error is proportional to the interval spacing. Therefore, this error can be minimized by reducing the interval size, which corresponds to the time between any two consecutive odd (or any two consecutive even) trigger patterns until this term is negligible. In certain cases, the reduction of the interval to reduce this error to a negligible level may not be practical.

In accordance with the principles of the present invention, in those cases where intervals cannot be reduced, the velocity of the disk is measured "on the fly." Errors in the written TP location will occur when the velocity of the disk is different during the read and the write step as in the dual revolution timing pattern propagation of U.S. Pat. No. 5,485,322. In one embodiment of the present invention, the nominal interval length corresponding to the average of the interval times (either or both readback and write interval times) for one complete rotation is used to estimate the disk average or nominal velocity.

Figure 19:
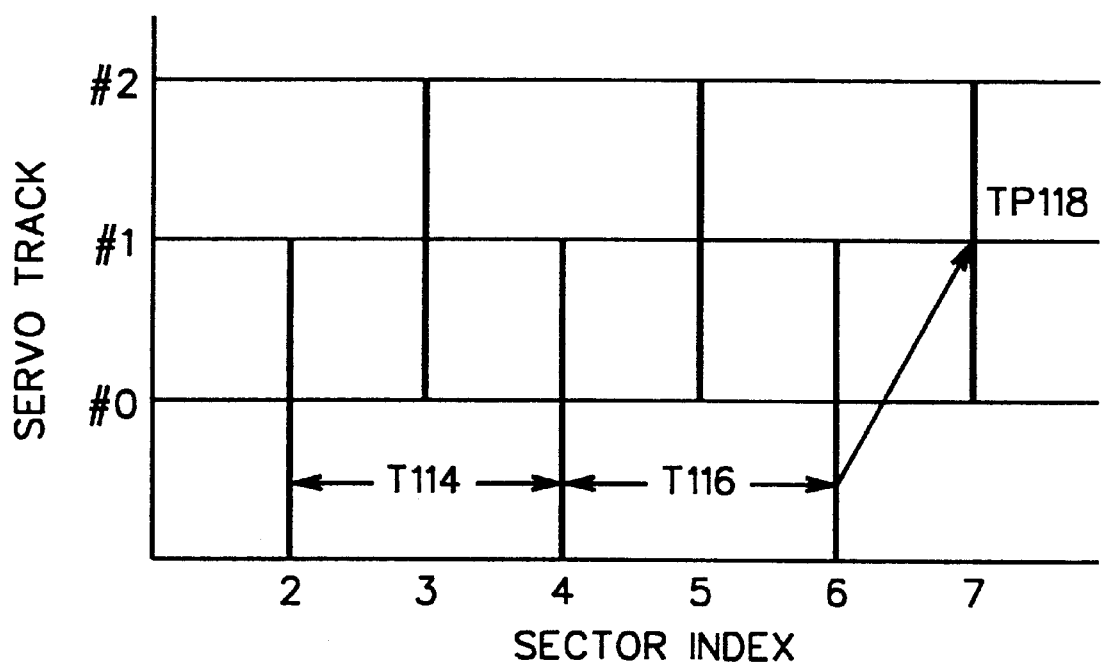
FIG. 19 shows one example of a technique to remove the effects of spindle velocity jitter, in accordance with the principles of the present invention.

In FIG. 19, by measuring the time interval between the TPs during the write process, a computation of the local disk velocity (i.e., substantially instantaneous velocity) can be obtained by comparing this interval (i.e., T116) with the nominal or expected interval at the nominal velocity. For example, computed velocity=nominal velocity×(T116÷(2× nominal interval time)).

As the rate of change of velocity is limited by the disk inertia, a set of interval measurements immediately preceding the TP to be written may be averaged to estimate the current disk velocity. For example, when the head is centered on servo track #1, intervals T 114 and T 116 can be measured to estimate the local disk velocity (i.e., LAIE+ Nominal Interval=TAI) prior to writing TP 118.

Another implementation of velocity error correction is described above with reference to FIGS. 12 and 18.

WINDOWING

Figure 12:
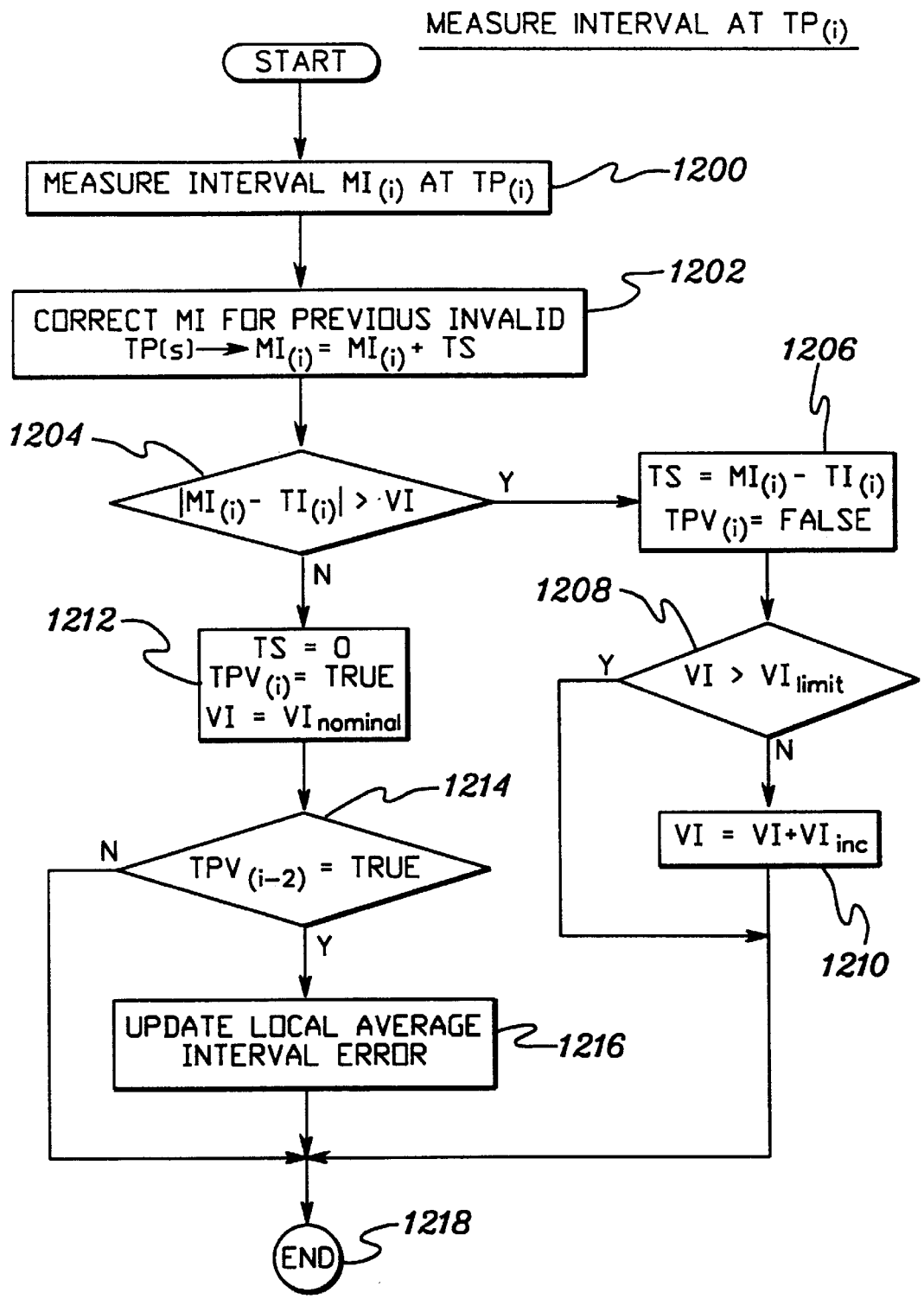
FIG. 12 depicts one embodiment of the logic used to measure intervals at $TP_i$, in accordance with the principles of the present invention.

As described above, windowing is used, in accordance with the principles of the present invention, to determine whether a particular trigger pattern is within a valid trigger pattern region is (see, for example, FIG. 12).

In a further aspect of the present invention, a hardware window is created to detect a trigger pattern, thereby eliminating false triggers in regions outside the expected region.

Figure 23:
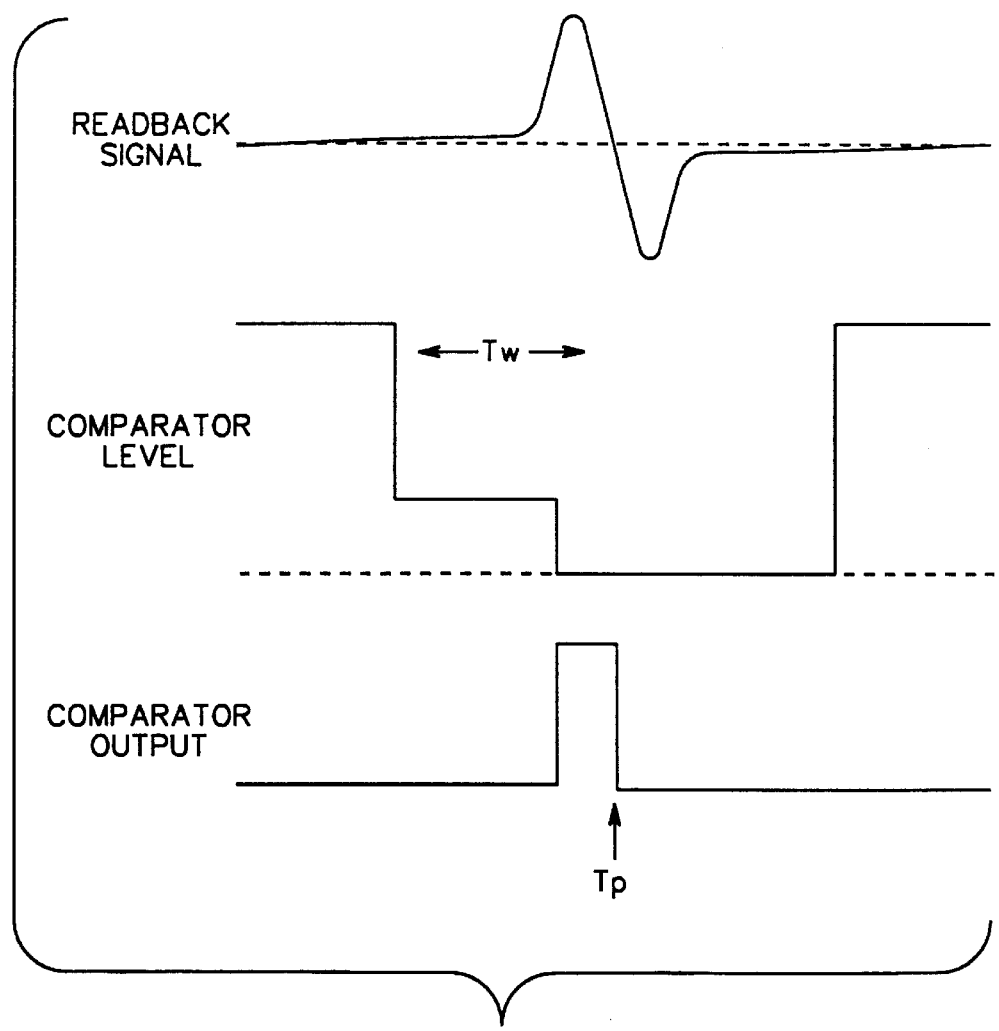
FIG. 23 depicts one example of a hardware technique to detect trigger patterns written on a disk, in accordance with the principles of the present invention.

For example, with reference to FIG. 23, trigger pattern detector 340 (FIG. 3C) includes, for instance, a comparator, which is used to detect a trigger pattern written on the disk. In one embodiment, the detector is enabled by lowering the comparator level (e.g., via trigger pattern window 346) at a time Tw (a time before the trigger pattern is expected), so that a read-back signal of the trigger pattern is higher than the comparator level. When the read-back signal is higher, then the detector is triggered. The comparator level is then further adjusted to zero. In particular, as the read-back signal comes down through zero, the comparator will go low, and the trigger pattern is detected on the negative edge of the comparator output.

When an expected trigger does not occur within a given time period, an automatic false (e.g., fake) trigger is created by an electronic signal generated by the hardware.

TECHNIQUE FOR IMPROVED INTERVAL CONTROL

Figure 20A:
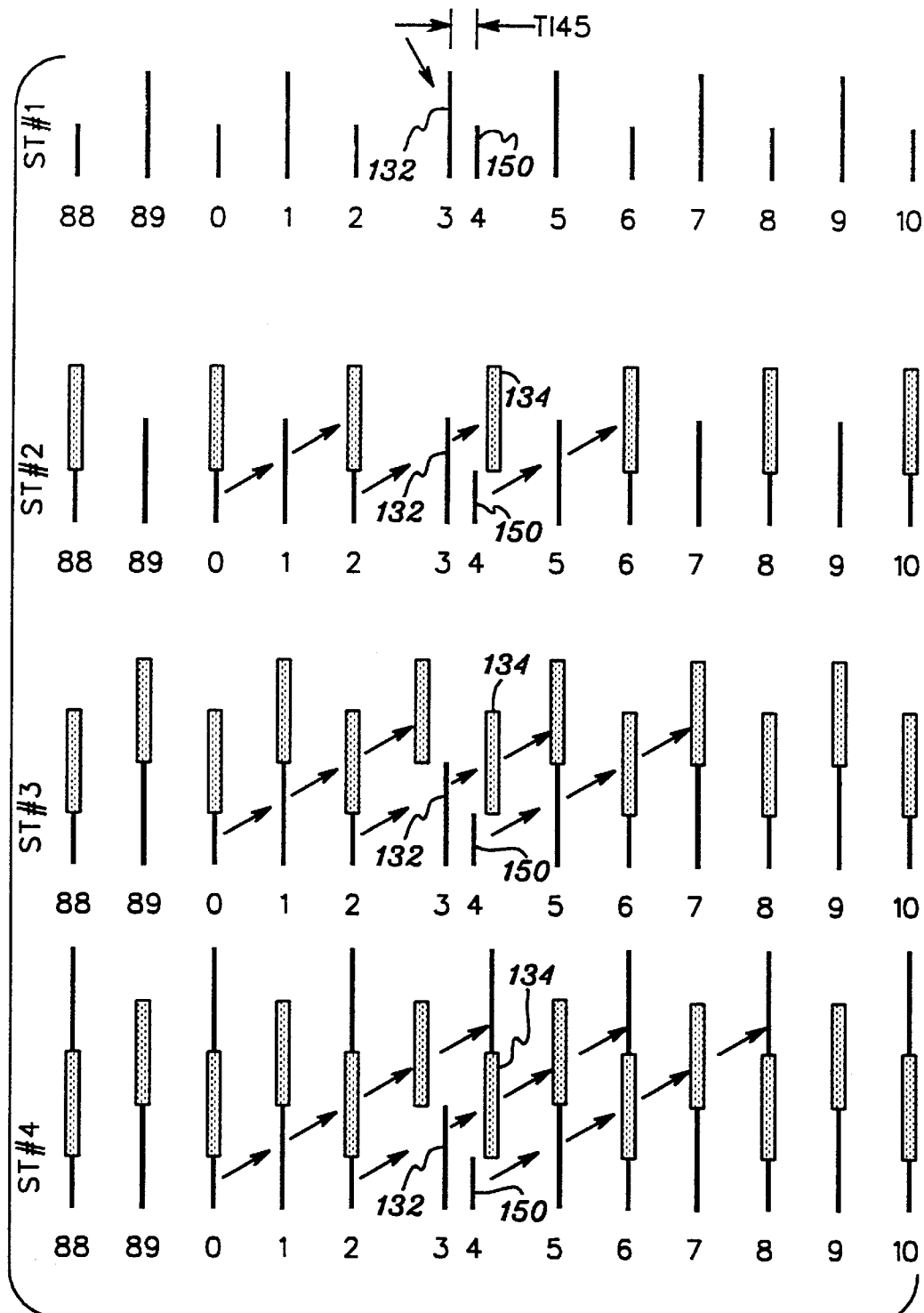
FIGS. 20a–20b show examples of a technique of clock propagation with reduced interval jitter, in accordance with the principles of the present invention.

The previously disclosed technique of U.S. Pat. No. 5,485,322 employs interval measurements during the trigger pattern propagation. When an error occurs in an interval, it is unknown which of the two TPs defining the interval is erroneously positioned. As a result, when the technique propagates with correction values of F (F is defined below) less than 1, the TP location errors propagate (in a decaying fashion) to neighboring locations. A demonstration of this is diagrammed in FIG. 20a. On servo track #1 (ST#1), TP 132 is erroneously shifted with respect to TP 150 resulting in an interval measurement T145 less than the nominal. On the next step of the process, the head is positioned on servo track #2 and TP 134 is written with an error to correct for the short interval T145. Subsequent writing of servo tracks #3 and #4 shows that the error of T145 propagates in a decaying fashion.

In accordance with the principles of the present invention, in the technique for improved interval control, information about the position of a particular TP is extracted. Rather than specifying a particular interval from the previous TP as the desired nominal position, the interval data from surrounding TPs are used to provide position information. The interval between the TPs currently being evaluated and each TP within a specified number of transitions is computed.

Figure 20B:
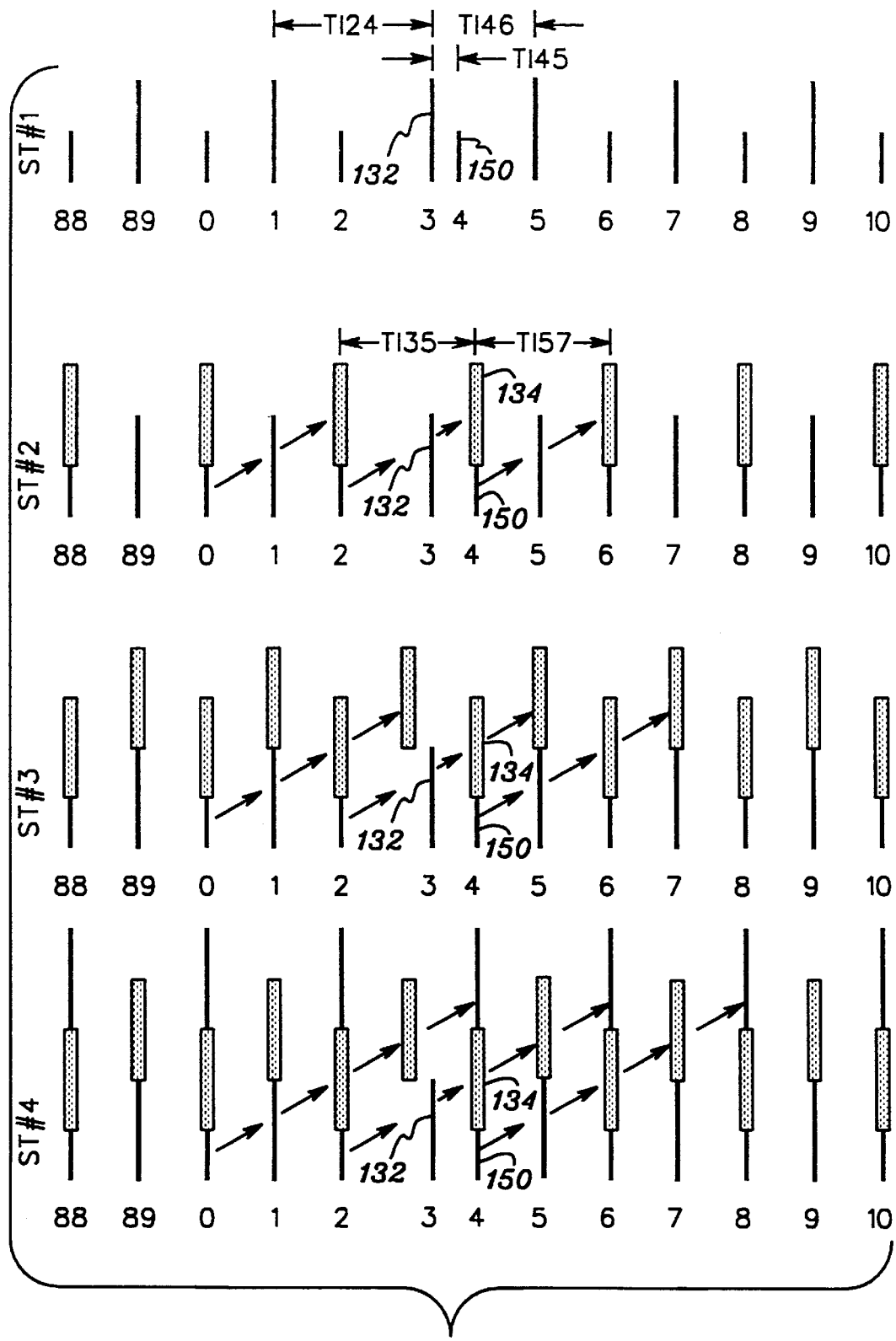

As an example of using the nearest neighbor comparison, the location of TP 132 is evaluated by measuring the interval T124 and T146 (see FIG. 20b). Similarly, TP 150 is evaluated by measuring T135 and T157. In the case where T124 and T146 are not equal, and T135 and T157 are equal, then the location of TP 132 is in error and not that of TP 150. In actual practice, this process is extended beyond nearest neighbors and averaged for an appropriate specified number of neighboring intervals to provide information on TP placement.

One embodiment of implementing the nearest neighbor comparison is depicted in the below pseudocode.

```
for (i=1; i <= SECTORS; i++)
    {
    t=i+SECTORS
    if (m = !m)
        {
        rangetotal=0;
        for (u=- (RANGE-1), u<= (RANGE), u++)
            rangetotal+=delval (t+u);
        rangeavg=rangetotal/(RANGE*2);
        rangetotal=rangeerr=0;
        for (u=0, u<= (RANGE-1), u++)
            {
            rangetotal+=delval (t-u);
            rangeerr+=rangetotal- ((u+1)
                *rangeavg);
            }
        rangetotal=0;
        for (u=1, u<=RANGE, u++)
            {
            rangetotal+=delval (t+u);
            rangeerr-=rangetotal- (u
                *rangeavg);
            }
        delerr+rangeerr/(RANGE*2);
        delout=delval[i] - delerr/2;
        delta=delout-delnom;
        delvlt=delta/0.125000E-9;
        if (delvlt>3000)
            delvlt=3000;
        if (delvlt<500)
            delvlt=500;
        voltodd[i/2+1]=delvlt;
```

-continued

```
        }
else
        {
        rangetotal=0;
        for (u=-(RANGE-1), u<=(RANGE), u++)
                rangetotal+=delval (t+u);
        rangeavg=rangetotal/(RANGE*2);
        rangetotal=rangeerr=0;
        for (u=0, u<=(RANGE-1), u++)
                {
                rangetotal+=delval (t-u);
                rangeerr+=rangetotal- ((u+1)
                    *rangeavg);
                }
        rangetotal=0;
        for (u=1, u<=RANGE, u++)
                {
                rangetotal+=delval (t+u);
                rangeerr-=rangetotal- (u
                    *rangeavg);
                }
        delerr=rangeerr/(RANGE*2);
        delout=delval[i]-delerr/2;
        delta=delout - delnom;
        delvlt=delta/0.125000E-9;
        if (delvlt>3000)
                delvlt=3000;
        if (delvlt<500)
                delvlt=500;
                volteven[i/2]=delvlt;
                }
```

The above code estimates an interval error based on a number of surrounding intervals equal to 2*RANGE. It first computes an average interval value for the intervals within RANGE of the interval whose error is being computed. For each first trigger pattern within RANGE of the later trigger pattern of the second two trigger patterns which compose the interval of interest, the time distance between the first trigger pattern and the latter of the second two trigger patterns is computed and compared to the expected distance for local nominal intervals (rangeavg). An error contribution is obtained from each of these comparisons (rangeerr+= rangetotal-(u*rangeavg)). The average of these error contributions is the estimated error in the time of the latter of the second two trigger patterns. Some portion of this error is used to correct the subsequent write of the interval of interest.

SINGLE REVOLUTION TIMING PATTERN

Timing information in the form of equally spaced trigger patterns (which consist, for example, of one or more written magnetic transitions) at one radial position on a disk surface can be propagated over the entire disk radius without incurring a growth in the track to track alignment of the timing information. This process is further accomplished within a single revolution per servo track, thereby adding no additional time to the process of servowriting the disk drive. The importance of this advance is critical for cases where the self-generation process occurs external to the disk drive and where additional rotations of the storage media directly impact the number of servowriter systems required. For example, a system which required two revolutions of the rotating storage media to write a timing pattern and one additional revolution to move the recording head to the next servo track location would require 50% more servowriters than the technique described above. This can represent a large capital cost, when the servowriter is external to the storage device.

Figure 21:
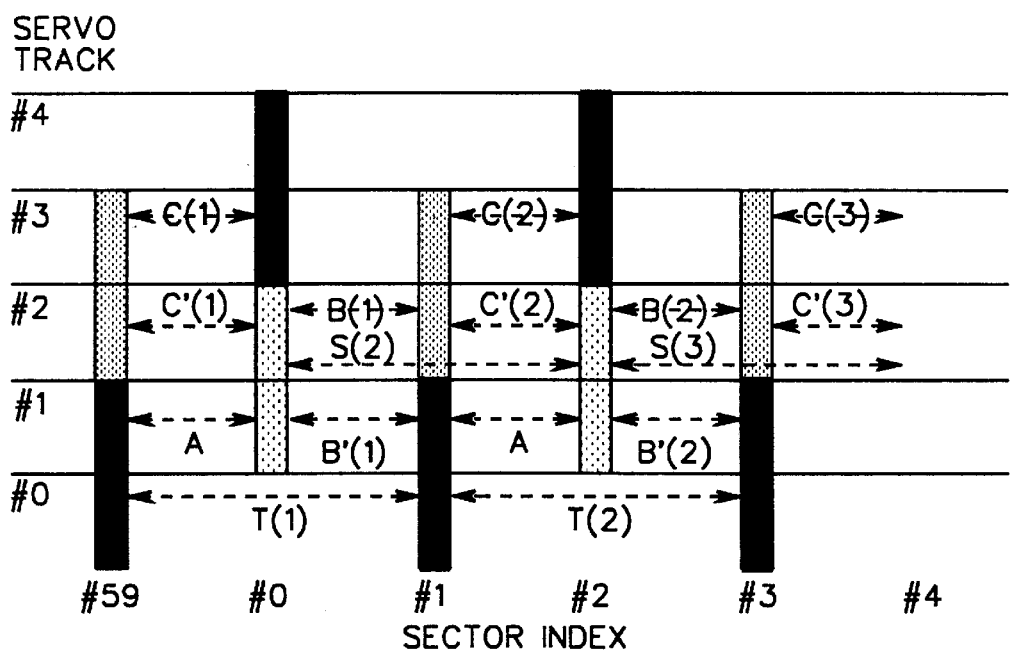
FIG. 21 shows one example of a technique of clock propagation without incurring an additional revolution of the disk, in accordance with the principles of the present invention.

One example of the process of self-propagation of a timing pattern is described in the steps below and is shown in FIG. 21. In this example, A is equal to one half the interval T, but in general A can be any fraction of T.

1. A recording head is located on servo track location #0 and writes a series of odd number trigger patterns corresponding to every other sector on the disk surface, with an average interval size T.
2. The recording head is servo-positioned to servo track location #1.
3. The recording head triggers on each of the N odd numbered trigger patterns and writes an even number trigger pattern at a time A following each odd numbered trigger pattern. During this write sequence the time interval between every two adjacent odd numbered trigger patterns is measured and recorded in a computer memory as the values $T(n)$, where n runs from 1 to N.
3a. The interval $B'(n)$ is computed as $T(n)-A$.
3b. The deviation between $B'(n)$ and the nominal interval (e.g., A) is calculated and stored. This deviation is the random error for interval $B'(n)$, which is equal to $T(n)-2A$.
4. The target intervals $B(n)$ are computed from the deviation and the nominal interval (A), given by $B(n)=F*\{T(n)-2A\}+A$, where F is described below.
5. The recording head is servo-positioned to the next servo track location.
6. The recording head triggers on each of the N even numbered trigger patterns and writes an odd number trigger pattern at a time $B(n)$ after each of the even numbered trigger pattern. During this write sequence, the time interval between every two adjacent even numbered trigger patterns is measured and recorded in a computer memory as the values $S(n)$.
6a. The interval $C'(n)$ is computed as $S(n)-B(n-1)$.
6b. The deviation between $C'(n)$ and the nominal interval A is calculated and stored. This deviation is the random error for interval $C'(n)$, which is equal to $S(n)-B(n-1)-A$.
7. The target intervals $C(n)$, are computed from the stored time intervals and the intervals $B(n)$ given by $C(n)=F*\{S(n)-B(n-1)-A\}+A$.
8. The recording head is servo-positioned to the next servo track location.
9. The recording head triggers on each of the N odd numbered trigger patterns and writes an even numbered trigger pattern at a time $C(n)$ after each of the odd numbered trigger pattern. During this write sequence the time interval between every two adjacent odd numbered trigger patterns is measured and recorded in a computer memory as the values $T(n)$.
10. The intervals $B(n)$, are commuted from the stored time intervals and the intervals $C(n)$ given by $B(n)=F*\{T(n)-C(n)\}+\{1-F\}*A$.
11. Proceed to process step #5 and repeat steps #5–#10 until the entire disk surface is filled with clock information.

In the above, F is a number from 0 to 1 which represents the weighting factor used to correct track to track misalignment. For example when F=1, the track to track misalignment error is minimized, but the absolute interval will deviate from the nominal value. When F=0 the nominal interval size is maintained but track to track errors will grow unbounded.

It is understood that in addition to the above process to remove random error growth, one measures and corrects for all systematic delays due to both electronic and geometric effects, as described earlier. In addition, the technique previously described of "Improved Algorithm for Interval Control" can similarly be applied to this process.

In one embodiment, IC, as described above, is added to SD0 to produce the new value of SD, i.e., SD=SD0+IC.

Figure 22:
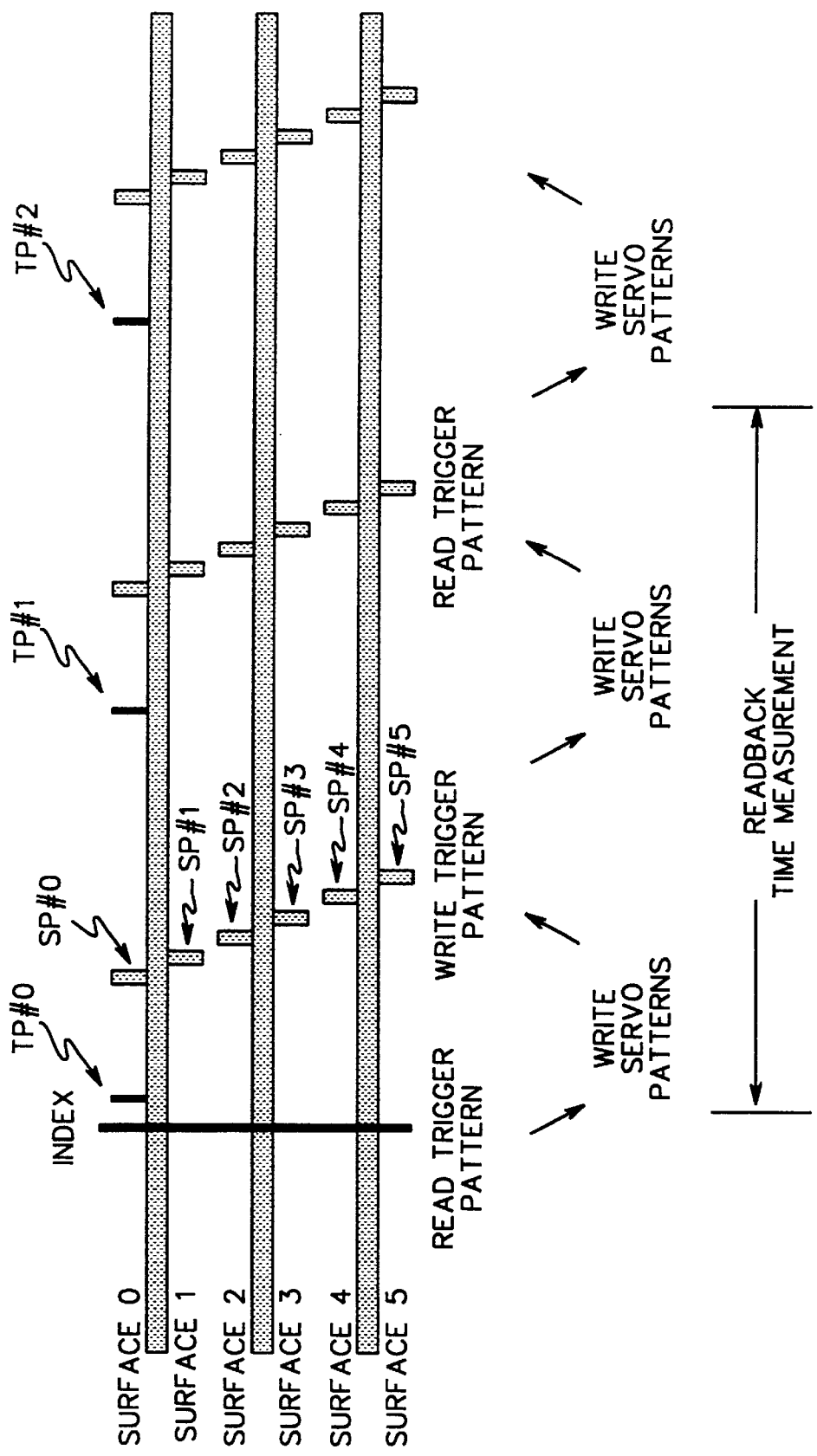
FIG. 22 shows one example of how servo patterns are written with a single revolution clock propagation process, in accordance with the principles of the present invention.

The propagation of servo patterns using this clock propagation process is shown in FIG. 22. The recording head is set to read mode and triggers on TP 0, which begins gating a pattern generator to write servo pattern #0. Then, the next recording head in the stack is selected and a second servo pattern #1 is written on surface #1 and repeated to N surfaces. The number N is limited by the time required to write each surface and the head switch time. At the end of the Nth surface, the head is switched to the first surface #0 in time to write the next sector TP 1.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of generating timing patterns for self-servowriting of a storage medium of a storage device, said method comprising:
    writing a first set of trigger patterns at a first radial location of said storage medium;
    writing another set of trigger patterns at a second radial location of said storage medium, and during a same revolution as writing the another set of trigger patterns, measuring time intervals of one or more of the first set of trigger patterns; and
    writing one or more trigger patterns at a subsequent radial location of said storage medium at locations derived at least in part from the measured time intervals of said one or more of the first set of trigger patterns.

2. The method of claim 1, further comprising:
    determining one or more random errors in location of said first set of trigger patterns using the measured time intervals of said one or more of the first set of trigger patterns; and
    computing one or more correction values to compensate for said one or more random errors;
    wherein said writing one or more trigger patterns at a subsequent radial location of said storage medium includes writing at locations derived at least in part from said correction values, wherein random errors in placement of said one or more trigger patterns at said subsequent radial locations are reduced.

3. The method of claim 2, wherein determining of at least one random error of said one or more random errors comprises determining a deviation between a time interval and a nominal time interval.

4. The method of claim 3, wherein said time interval is a computed interval between a measured trigger pattern and an estimated location of another trigger pattern.

5. The method of claim 3, wherein said computing comprises multiplying said at least one random error by a fraction to obtain at least one of said one or more correction values.

6. The method of claim 1, further comprising correcting for one or more systematic errors.

7. The method of claim 6, wherein said correcting of at least one systematic error of said one or more systematic errors comprises:
    measuring a time interval between a trigger pattern written at said first radial location of said storage medium and a rotational index, said rotational index being related to the rotational orientation of the storage medium with respect to a fixed frame of said storage device; and
    shifting location of another trigger pattern to be written, said shifting using said measured time interval in determining the shift in location for said another trigger pattern.

8. An apparatus for generating timing patterns for self-servowriting of a storage medium of a storage device, said apparatus comprising:
    a pattern generator adapted to write a first set of trigger patterns at a first radial location of said storage medium;
    a controlling unit adapted to measure time intervals of one or more of the first set of trigger patterns during a same revolution in which the pattern generator is writing another set of trigger patterns at a second radial location of said storage medium; and
    the pattern generator adapted to write one or more trigger patterns at a subsequent radial location of said storage medium at locations derived at least in part from the measured time intervals of said one or more of the first set of trigger patterns.

9. The apparatus of claim 8, further comprising:
    a processing unit adapted to determine one or more random errors in location of said first set of trigger patterns using the measured time intervals of said one or more of the first set of trigger patterns; and
    the processing unit adapted to compute correction values to compensate for said one or more random errors; and
    wherein the pattern generator writes the one or more trigger patterns at a subsequent radial location of said storage medium at locations derived at least in part from said correction values, wherein random errors in placement of said one or more trigger patterns at said subsequent radial location are reduced.

10. The apparatus of claim 9, wherein said controlling unit is adapted to determine a deviation between a time interval and a nominal time interval in determining at least one random error of said one or more random errors.

11. The apparatus of claim 10, wherein said time interval is a computed interval between a measured trigger pattern and an estimated location of another trigger pattern.

12. The apparatus of claim 10, wherein said processing unit is adapted to multiply said at least one random error by a fraction to obtain at least one of said one or more correction values.

13. The apparatus of claim 8, wherein said controlling unit is further adapted to correct one or more systematic errors.

14. The apparatus of claim 13, wherein said controlling unit is further adapted to:
    measure a time interval between a trigger pattern written at said first radial location of said storage medium and a rotational index, said rotational index being related to the rotational orientation of the storage medium with respect to a fixed frame of said storage device; and
    shift location of another trigger pattern to be written, wherein said measured time interval is used in determining the shift in location for said another trigger pattern.

* * * * *

UNITED STATES PATENT AND TRADEMARK OFFICE
CERTIFICATE OF CORRECTION

PATENT NO.     : 6,324,027 B1                          Page 1 of 1
DATED          : November 27, 2001
INVENTOR(S)    : Chainer et al.

It is certified that error appears in the above-identified patent and that said Letters Patent is hereby corrected as shown below:

Column 1,
Line 19, delete the word "writing" and insert -- Writing --

Column 9,
Line 4, delete the word "Preventing" and insert -- preventing --

Signed and Sealed this

Second Day of April, 2002

Attest:

Attesting Officer

JAMES E. ROGAN
Director of the United States Patent and Trademark Office